(12) United States Patent
Chettiar et al.

(10) Patent No.: US 12,483,060 B2
(45) Date of Patent: *Nov. 25, 2025

(54) ENERGY STORAGE SYSTEM AND METHOD TO IMPROVE BATTERY PERFORMANCE BY BATTERY CONNECTION METHOD

(71) Applicant: SWITCHING BATTERY INC., Gilroy, CA (US)

(72) Inventors: Kannappan Karuppan Chettiar, Gilroy, CA (US); Veshant Chettiar, Gilroy, CA (US)

(73) Assignee: Switching Battery Inc., Gilroy, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,475

(22) Filed: Mar. 12, 2024

(65) Prior Publication Data

US 2024/0305111 A1    Sep. 12, 2024

Related U.S. Application Data

(60) Division of application No. 17/213,621, filed on Mar. 26, 2021, now Pat. No. 12,040,638, which is a
(Continued)

(51) Int. Cl.
*H02J 7/35* (2006.01)
*H02J 7/00* (2006.01)
*H02J 7/34* (2006.01)

(52) U.S. Cl.
CPC .............. *H02J 7/35* (2013.01); *H02J 7/0024* (2013.01); *H02J 7/0047* (2013.01);
(Continued)

(58) Field of Classification Search
CPC ...... H02J 7/0013; H02J 7/0019; H02J 7/0024; H02J 7/0047; H02J 7/0068; H02J 7/35; H02J 1/108; G05F 1/67
(Continued)

(56) References Cited

U.S. PATENT DOCUMENTS

| 2,725,488 A | 11/1955 | Hueffed et al. |
| 3,459,957 A | 8/1969 | Kelley |

(Continued)

FOREIGN PATENT DOCUMENTS

| CN | 102869533 A | 1/2013 |
| CN | 103236832 A | 8/2013 |

(Continued)

OTHER PUBLICATIONS

Electrical Engineering; "Wiring parallel and series simultaneously"; [online] URL; https://electronics.stackexchange.com/questions/269163/wiring-parallel-and-series-simultaneously/269188#269188; Nov. 14, 2016, 2 pages.

(Continued)

*Primary Examiner* — Edward Tso
*Assistant Examiner* — Aaron Piggush
(74) *Attorney, Agent, or Firm* — Maier & Maier, PLLC

(57) ABSTRACT

Two or more batteries may be in a switching para-series circuit arrangement where a set of batteries are connected, in both parallel and series arrangement in two independent phases, using fast switching devices, where the output to the load is the average voltage based on the duty cycles. Renewable energy power source such as solar panels may be coupled with batteries in parallel connection in a first phase and the same batteries connected in series to the load in a second phase, using transistor switches that, first, enables simultaneous charging and discharging of the batteries, and second, enables voltage shifting from the solar panel, as the additional batteries in series provide the required voltage to the load and where the duty cycles of charging and discharging is adjustable to convert the voltage waveform.

2 Claims, 35 Drawing Sheets

Related U.S. Application Data continuation-in-part of application No. 16/574,218, filed on Sep. 18, 2019, now Pat. No. 11,398,735.

(60) Provisional application No. 62/740,546, filed on Oct. 3, 2018.

(52) U.S. Cl.
CPC ............ *H02J 7/0068* (2013.01); *H02J 7/345* (2013.01); *H02J 7/0013* (2013.01); *H02J 7/0019* (2013.01)

(58) Field of Classification Search
USPC .......................... 320/101, 117, 118, 121, 158
See application file for complete search history.

(56) References Cited

U.S. PATENT DOCUMENTS

| | | | |
|---|---|---|---|
| 5,528,122 A | 6/1996 | Sullivan et al. | |
| 5,734,205 A * | 3/1998 | Okamura | H02J 7/0024 |
| | | | 320/117 |
| 5,994,965 A | 11/1999 | Davis et al. | |
| 6,430,692 B1 | 8/2002 | Kimble et al. | |
| 7,456,610 B2 * | 11/2008 | Yamashita | H02J 7/04 |
| | | | 320/158 |
| 7,489,048 B2 | 2/2009 | King et al. | |
| 10,106,110 B1 | 10/2018 | Ganiere | |
| 10,742,030 B2 * | 8/2020 | Sharifipour | H02J 3/26 |
| 11,398,735 B2 * | 7/2022 | Chettiar | H02J 7/0024 |
| 11,799,301 B2 * | 10/2023 | Chettiar | H02J 7/0013 |
| 12,040,638 B2 * | 7/2024 | Chettiar | H02J 7/0047 |
| 2010/0139743 A1 * | 6/2010 | Hadar | H02J 3/388 |
| | | | 136/251 |
| 2011/0273152 A1 * | 11/2011 | Weir | H02M 3/158 |
| | | | 323/282 |
| 2012/0123492 A1 | 5/2012 | Hunt et al. | |
| 2014/0077764 A1 | 3/2014 | Brun-Buisson et al. | |
| 2014/0166066 A1 * | 6/2014 | Hennessy | H01L 31/05 |
| | | | 136/244 |
| 2014/0312700 A1 * | 10/2014 | Catthoor | G05F 1/67 |
| | | | 307/77 |
| 2015/0270709 A1 * | 9/2015 | Abu Qahouq | H02J 1/108 |
| | | | 307/29 |
| 2016/0036251 A1 | 2/2016 | Ma | |
| 2016/0144722 A1 * | 5/2016 | Arumugam | B60L 53/52 |
| | | | 290/45 |
| 2016/0211682 A1 | 7/2016 | Chien | |
| 2016/0219664 A1 * | 7/2016 | Ellenberger | H02J 7/0024 |
| 2018/0345806 A1 | 12/2018 | Lee et al. | |
| 2019/0176650 A1 | 6/2019 | Wood et al. | |
| 2019/0288528 A1 | 9/2019 | Greetham | |
| 2019/0288536 A1 | 9/2019 | Götz et al. | |
| 2019/0342979 A1 | 11/2019 | Liu et al. | |
| 2020/0086761 A1 | 3/2020 | Hamada et al. | |
| 2020/0274370 A1 | 8/2020 | Krieg | |
| 2021/0126580 A1 * | 4/2021 | Moslehi | H02J 3/46 |

FOREIGN PATENT DOCUMENTS

| | | |
|---|---|---|
| EP | 2980953 A2 | 2/2016 |
| EP | 3168957 A1 | 5/2017 |
| JP | 5070793 B2 | 11/2012 |
| JP | 2014003858 A | 1/2014 |
| WO | 2012/063385 A1 | 5/2012 |
| WO | 2017/102414 A1 | 6/2017 |
| WO | 2017093170 A1 | 6/2017 |
| WO | 2018096341 A1 | 5/2018 |

OTHER PUBLICATIONS

Notification of Transmittal of the International Search Report and the Written Opinion of the International Searching Authority, or the declaration issued on Aug. 25, 2021, in connection with corresponding International Application No. PCT/US2021/025513; 13 pages.
Search Report issued on Mar. 23, 2022, in corresponding European Application No. 19868765.9; 8 pages.
Notification of Transmittal of the International Search Report and the Written Opinion of the International Searching Authority issued on Jan. 2, 2020, in connection with corresponding international Application No. PCT/US19/54249 (8 pgs.).
Office Action issued on Apr. 29, 2024, in corresponding Chinese Application No. 201980065092.2, 16 pages.

* cited by examiner

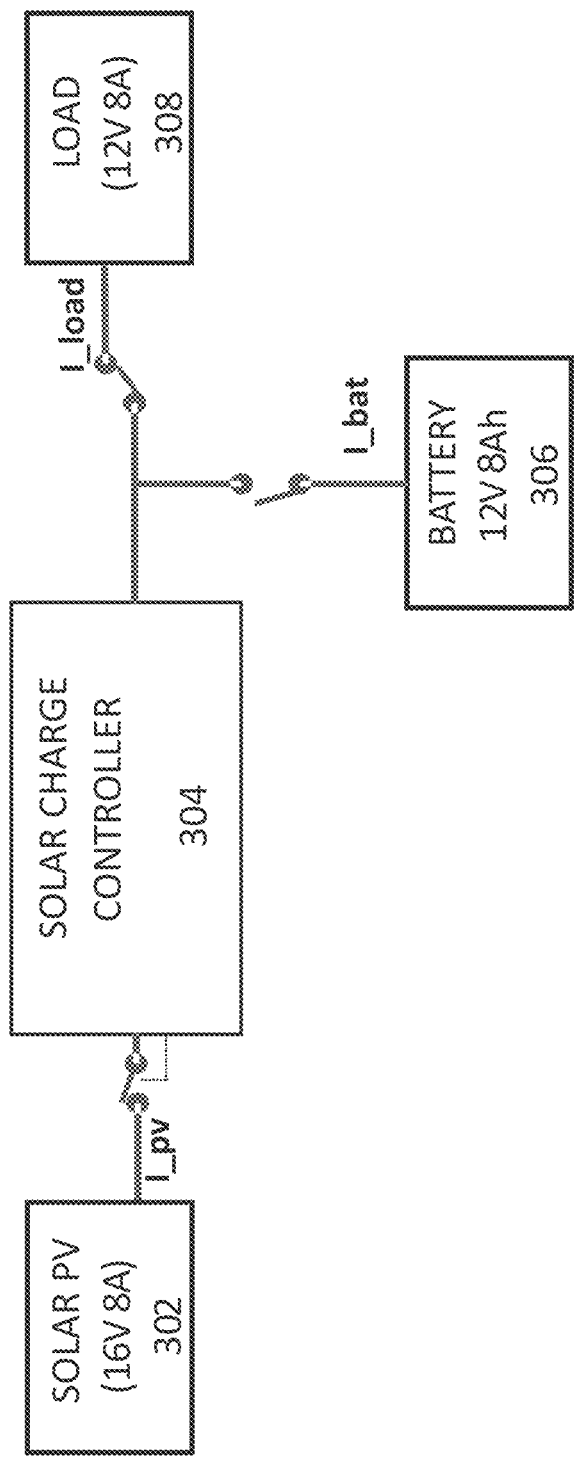
Fig. 3 — PRIOR ART

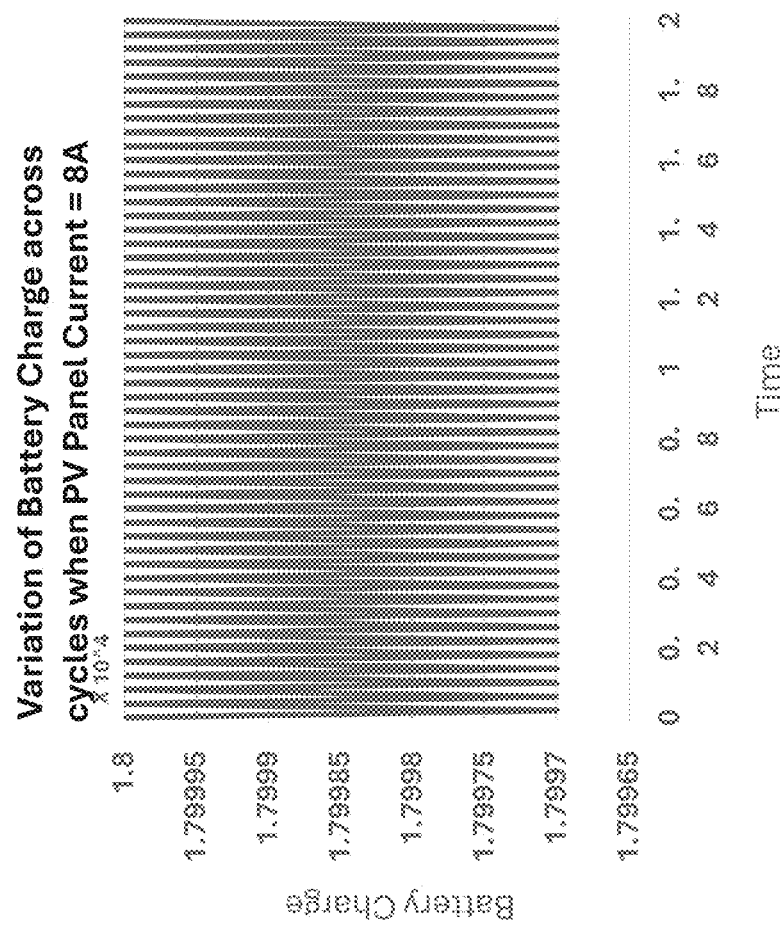
Fig: 5A

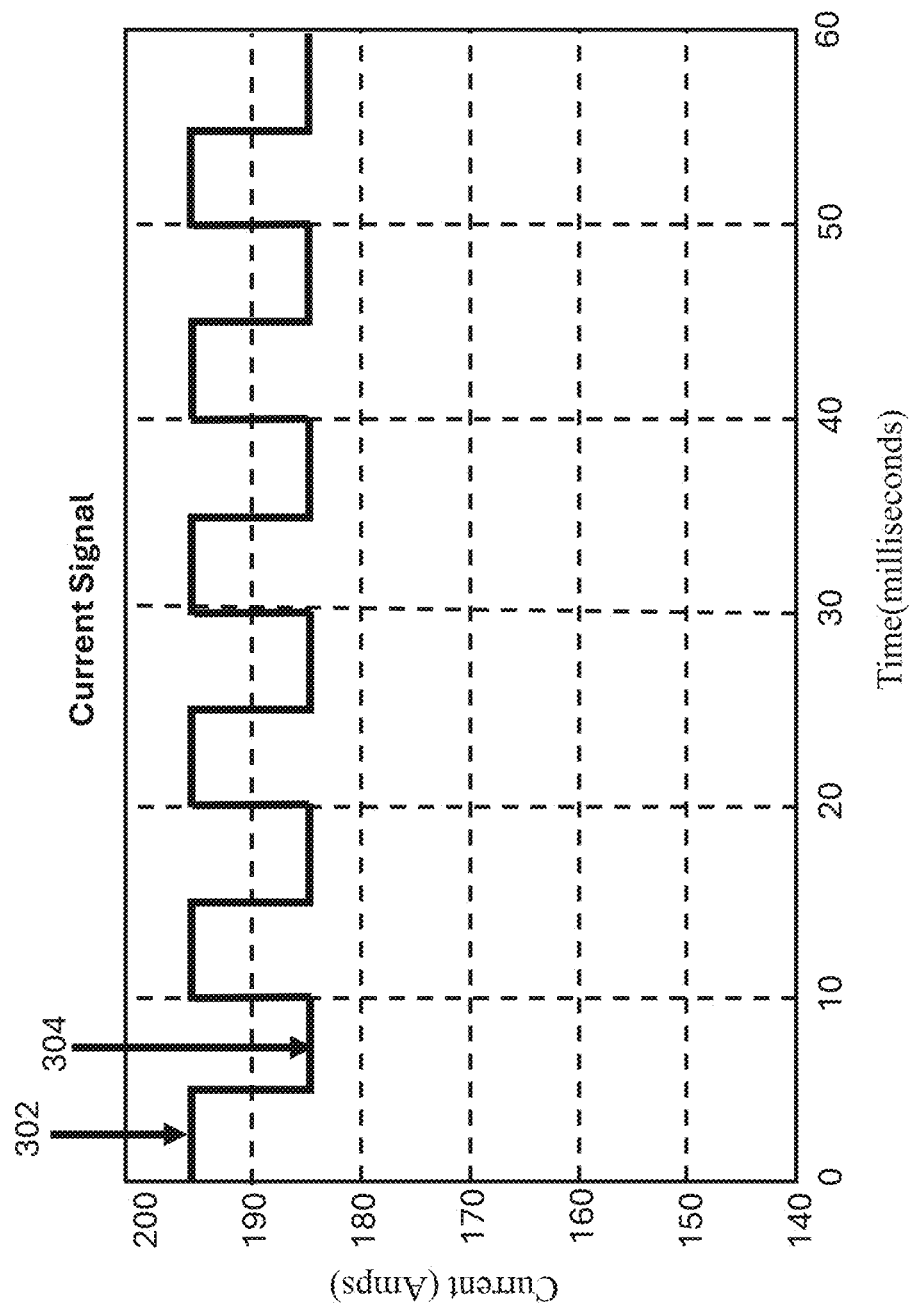

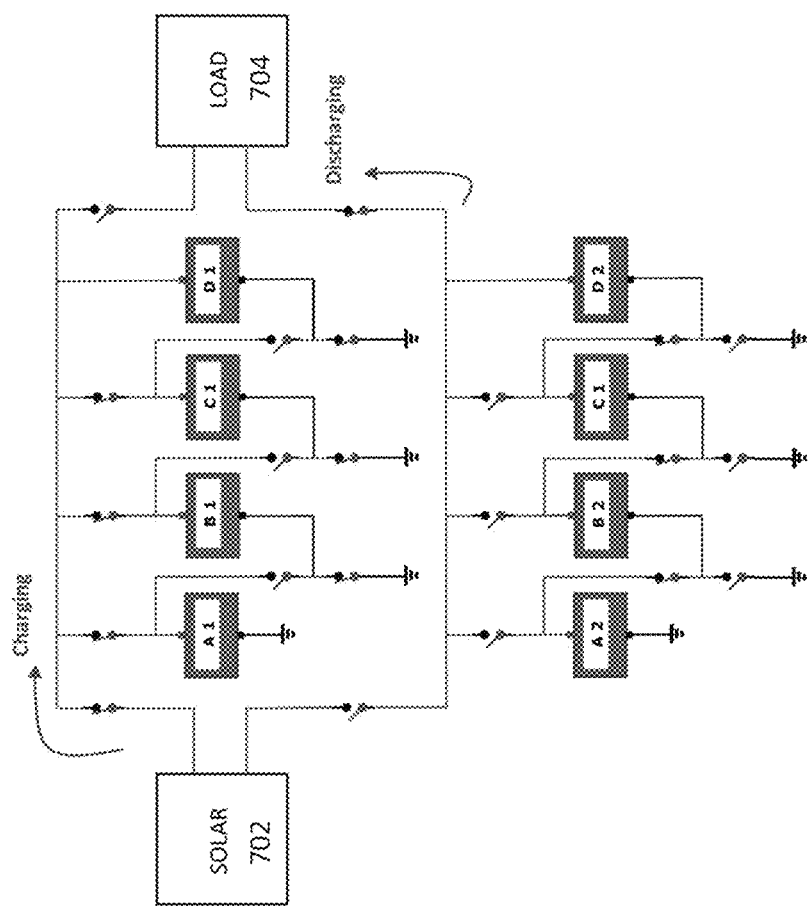

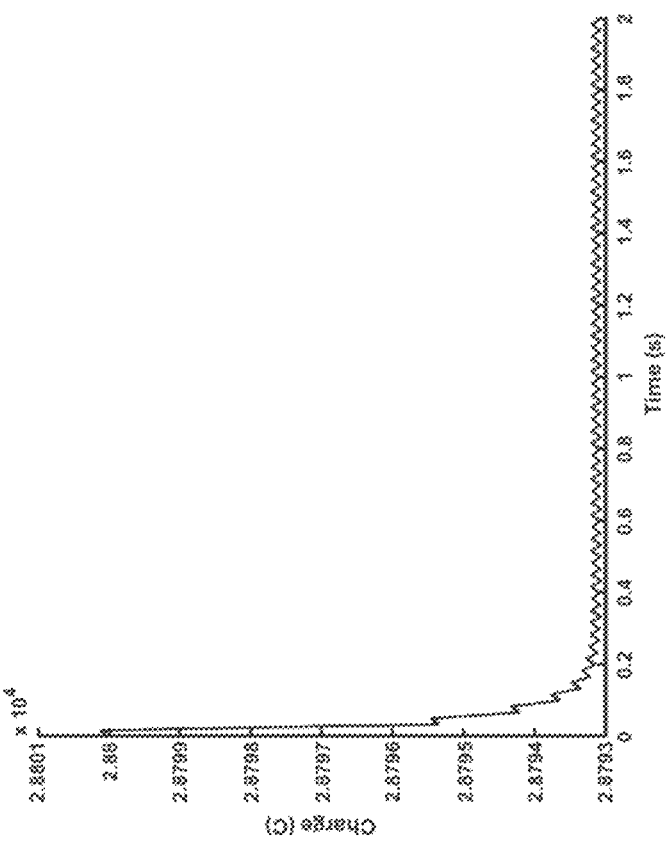
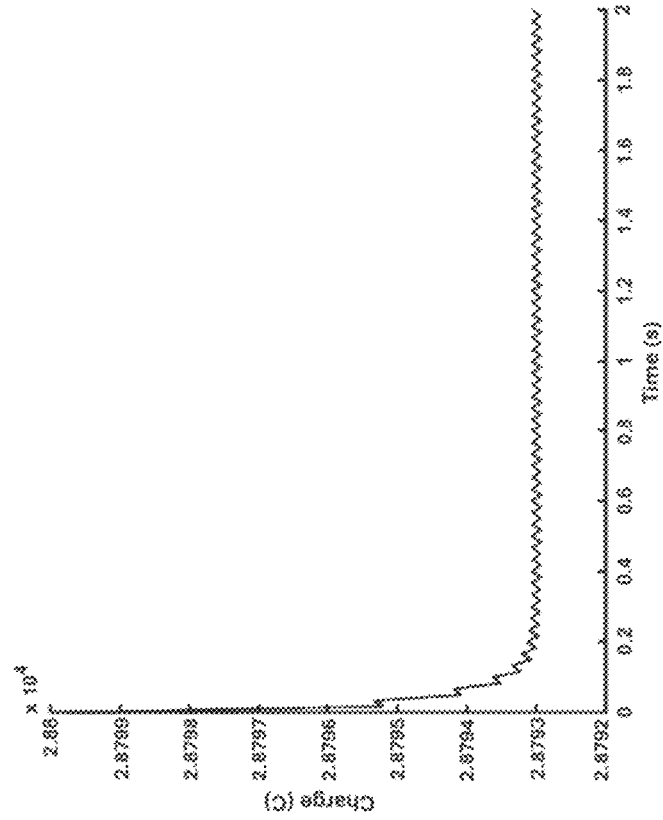
Fig. 9A

Variation of charge of input capacitor A, B, G and H with time
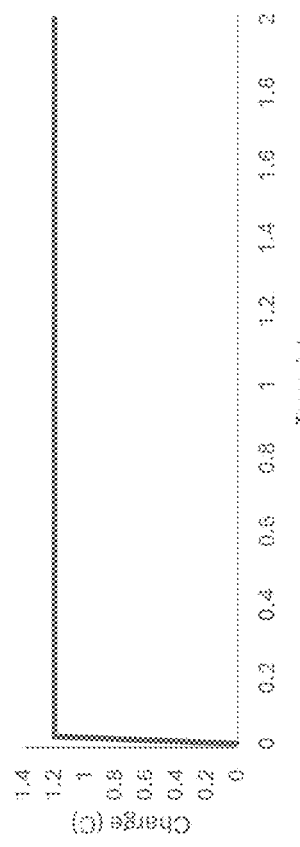
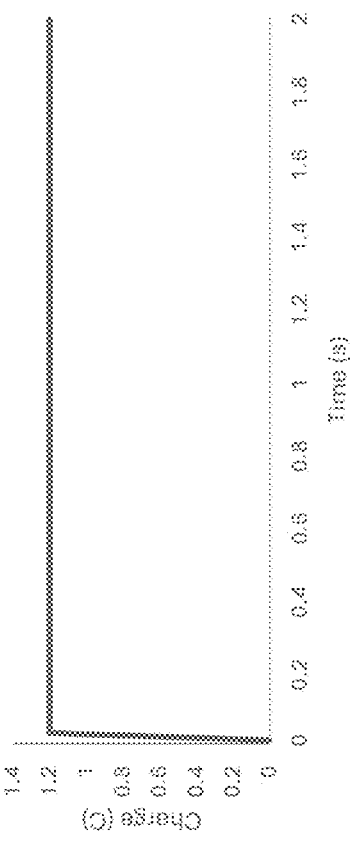
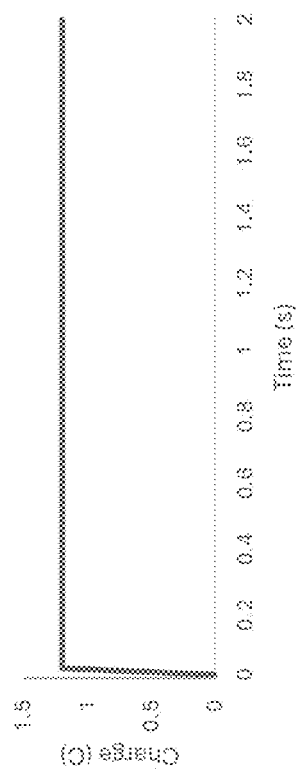
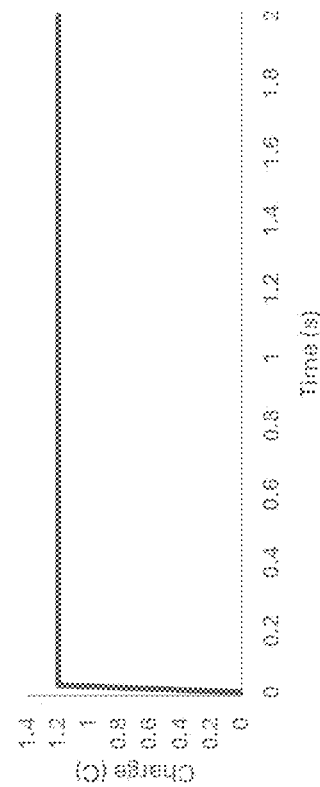
Fig. 9D Variation of Charge of output capacitor E,F,K and L with time
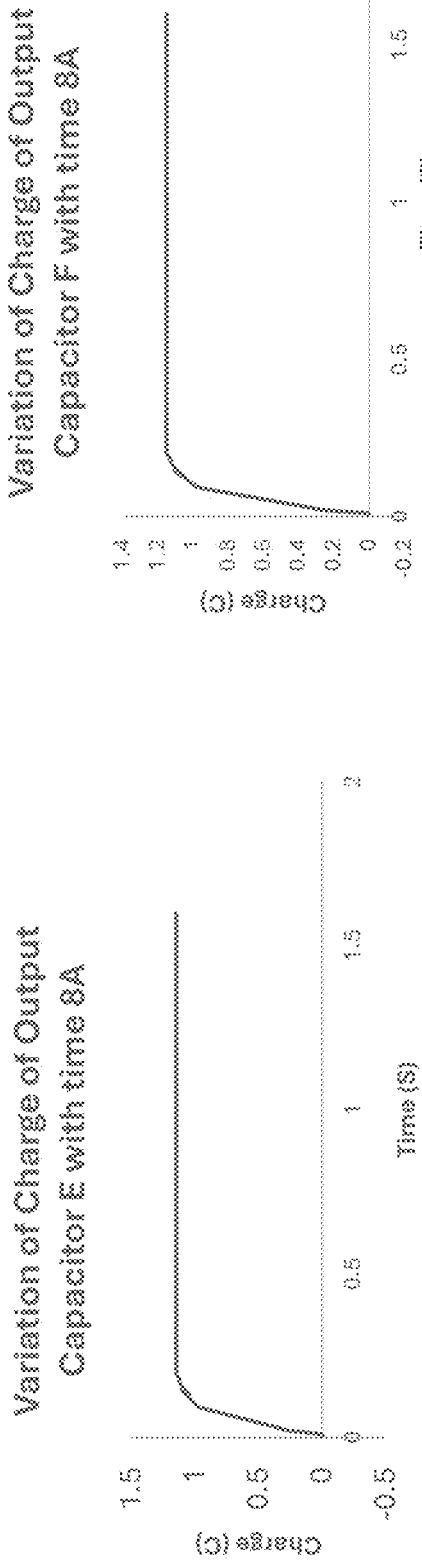
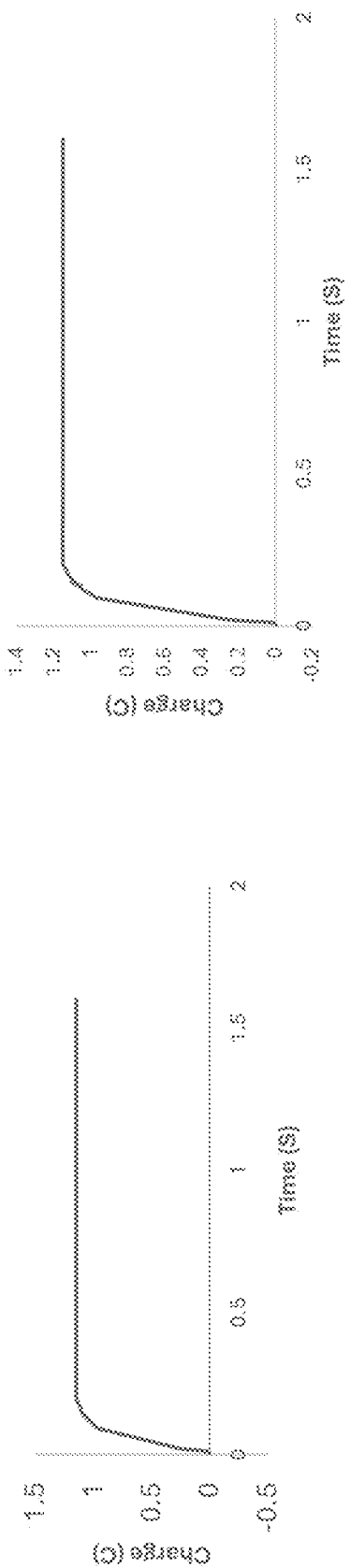
Fig: 9F

Fig. 10A

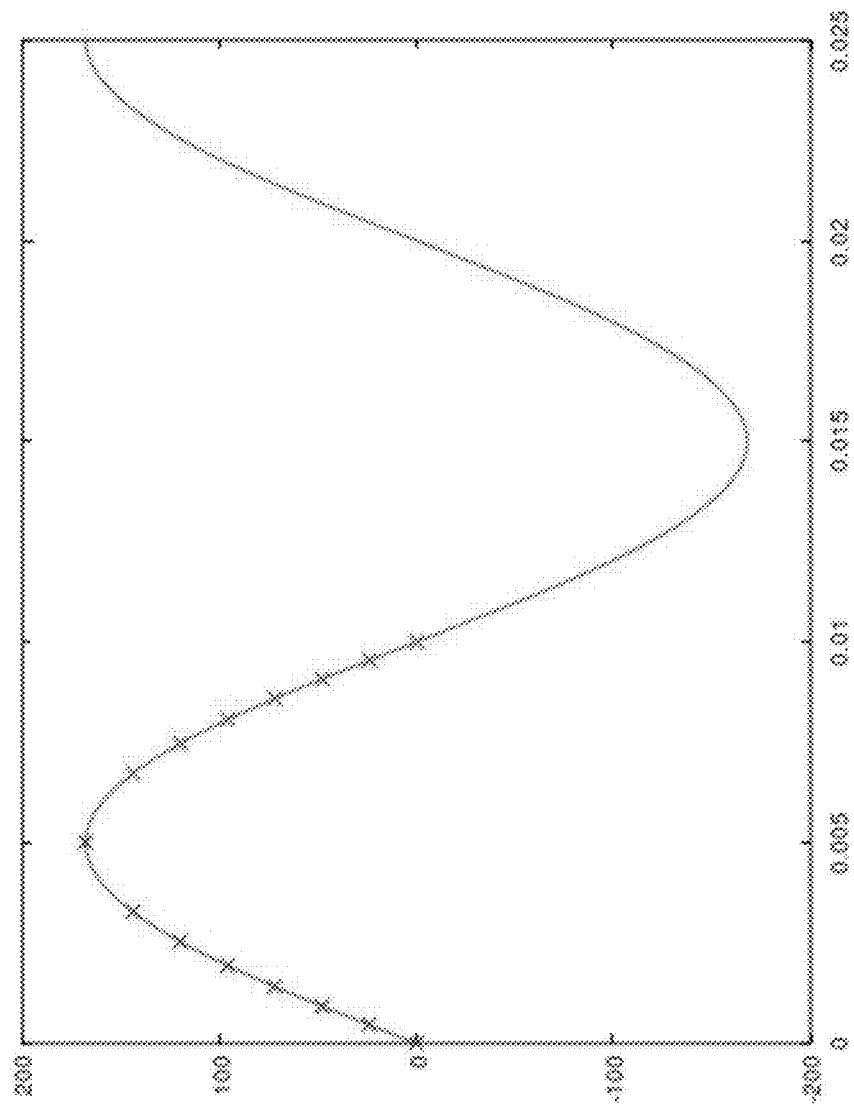

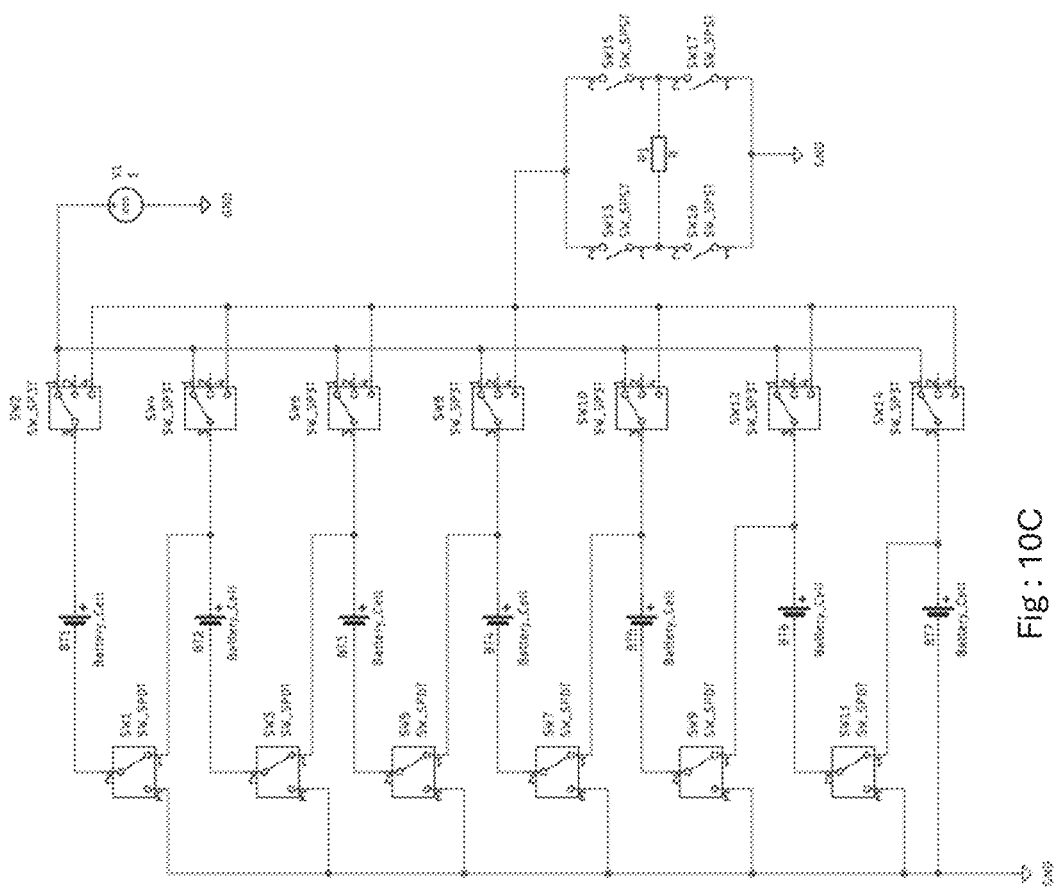
Fig: 10C

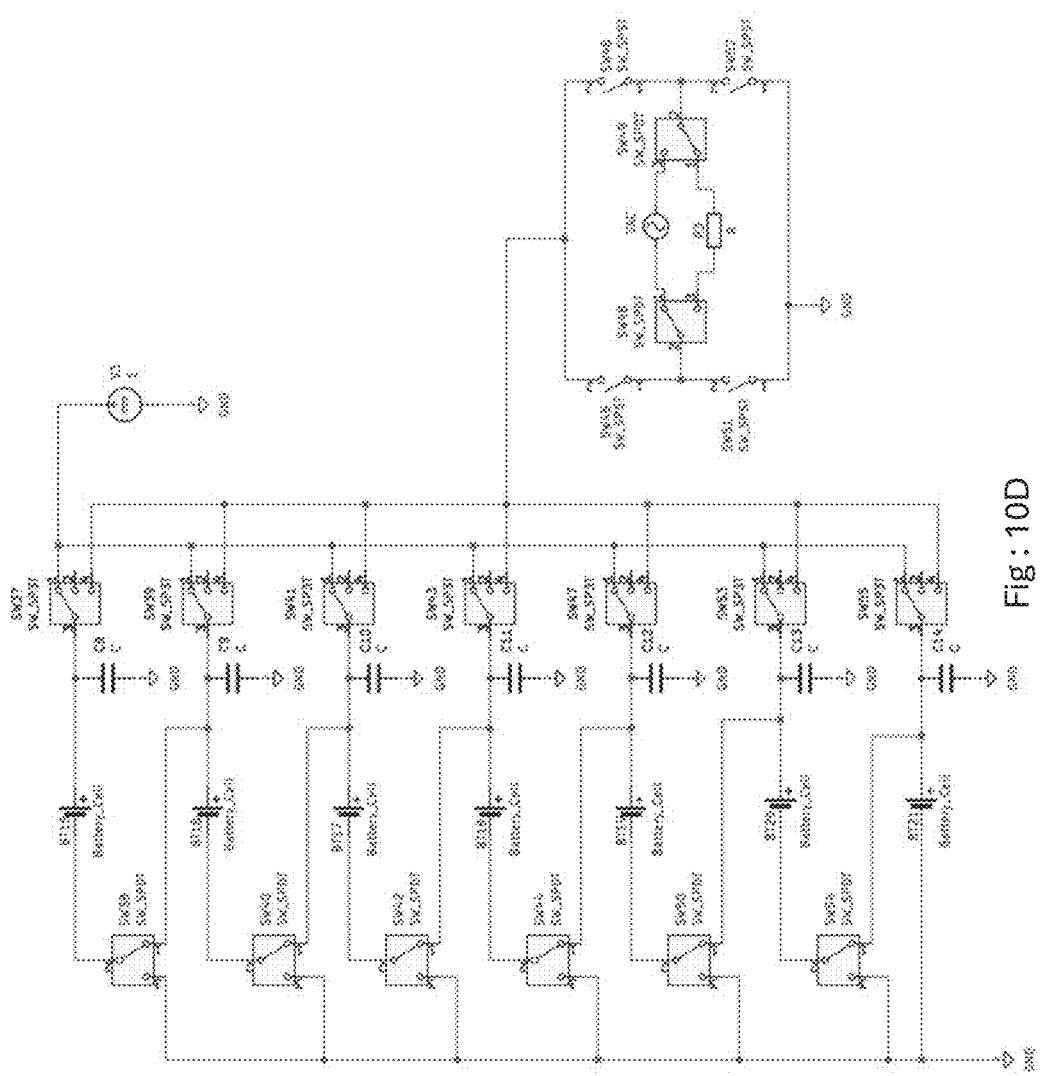
Fig: 10D

ENERGY STORAGE SYSTEM AND METHOD TO IMPROVE BATTERY PERFORMANCE BY BATTERY CONNECTION METHOD

CROSS-REFERENCE TO RELATED APPLICATION

The present patent application claims benefit and priority to divisional U.S. patent application Ser. No. 17/213,621, filed on Mar. 26, 2021, which is a continuation-in-part of U.S. patent application Ser. No. 16/574,218 entitled "ENERGY STORAGE SYSTEM AND METHOD TO IMPROVE BATTERY PERFORMANCE BY BATTERY CONNECTION METHOD (AMENDED)" filed on Sep. 18, 2019, and U.S. Provisional Application No. 62/740,546 filed on Oct. 3, 2018, which is hereby incorporated by reference into the present disclosure.

FIELD

An energy storage system and a method to improve performance of batteries may be shown and described.

BACKGROUND

Series and parallel connections are commonly known in the field of electronics. Parallel connections are preferred to charge batteries from a power source as parallel connections enable higher current amperage to enable the batteries to charge faster. Series connections are preferred to discharge batteries to a load or device as the battery voltage is required to be higher than the load or device to enable current to flow.

Batteries configured in parallel may naturally balance since they are directly connected to each other. However, batteries configured in series may have different state of charge (SoC) resulting in battery inefficiency as the smaller capacity battery may empty before the larger one when the voltage drops even further. Batteries configured in series may therefore require cell balancing for maintaining voltage levels of each cell to achieve maximum efficiency. Variation in voltage levels causes cell unbalancing, which could lead to a variety of problems. For example, cell unbalancing may lead to thermal runaway, cell degradation, incomplete use of pack energy, or the incomplete charging of the pack. Cells may become unbalanced due to variations of SoC, variation in their internal resistance, or variations in temperature.

Circuits wired in series work the same way for solar photovoltaic cells. If there is a problem with the connection of one panel in a series, the entire circuit fails. Meanwhile, one defective panel or loose wire in a parallel circuit will not impact the rest of the solar panels. A charge controller is a determining factor when it comes to solar panel wiring where Maximum Power Point Tracking (MPPT) charge controllers are preferred for wiring solar panels in a series and Pulse Width Modulation (PWM) charge controllers are used to wire solar panels in parallel.

Further, charge controllers may require separate inverter devices to power AC output appliances from the DC energy produced by renewable power sources. Additionally, due to intermittency of solar and other renewable energy, it may be advantageous to charge multiple batteries directly through AC input source instead of stepping-down voltage through transformers that dissipates energy through heat.

Typical batteries or energy storage systems may also not be charged and discharged simultaneously. Thus, they may not be able to drive a load while also receiving charge. This can be problematic when an energy storage system is used with a renewable source. These systems often require a central controller to control the charging and discharging of the system. FIG. 3 illustrates a typical prior art solar charge controller configuration. The solar photovoltaic (PV) cell 302 is the power source which connects to a charge controller 304. The charge controller then controls the connections between the source 302, the battery load 306, and the device load 308. The battery load 306 may be connected to charge the batteries, while the device load 308 may be connected to drive a load. When the batteries 306 are fully charged, I_bat is switched off. When the batteries 306 are depleted, I_load is switched off, and the batteries 306 are charged instead of driving the load 308. If the energy absorbed by the solar cell 302 is low or below a minimum, I_pv is switched off. A disadvantage of this type of battery charging system is that the battery competes with the desired load when a charge controller is used resulting in the load and battery sharing the power source from renewable power source such that I_pv=I_bat+I_load.

EV and other device manufacturers have used batteries typically as hardware configured either in series or parallel configuration and there is no flexibility in reconfiguration through software.

SUMMARY

Batteries may be connected using logic switches connected to each of its positive and negative nodes such that two or more batteries may be connected to a load in "para-series", that is in parallel and series, in alternate cycles to produce an average of the parallel and series voltage based on the relative duration of the cycles, to the load.

Batteries may also be connected to a renewable power source and a load using an isolated circuit where the batteries are connected to the renewable power source in parallel in one cycle and where the same batteries are connected to the load in another cycle such that the load receives power supply during the series duty cycle which may be varied from 0% to 100%. Batteries which are switched between, for example, a renewable power sources and a load may be referred to as switching batteries.

The batteries may therefore be coupled to a small solar photovoltaic renewable power source to be connected to a larger load as the load is isolated. Additionally, the battery SoC may improve when the power source is larger than the load.

A control unit may be configured to execute a set of instructions in the form of a program or code. The program or code may form software which is installed onto the control unit. The control unit may control the duty cycle to the load; it may also convert the square waveform to a sine waveform through software code by altering the relative switching speeds using voltage comparators between the two-phases. The control unit may also enable cell balancing using voltage comparators. Additionally, the control unit may enable AC input to be used to charge multiple batteries using synchronized charging method. The control unit may also add a second independent set of batteries to a 50% duty load cycle to provide a constant supply of energy to the load. The control unit may further implement a second or third renewable power source to ensure a 100% duty cycle to the load.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 3 is an exemplary embodiment of a prior art energy storage system.

FIG. 5A is an exemplary embodiment of battery charge waveform (8 A power source).

FIG. 7A is an exemplary embodiment of a current signal waveform.

FIG. 8B is an exemplary embodiment of an energy storage system configured to implement an exemplary isolated load charging system using 8 batteries.

FIG. 9A is an exemplary embodiment of a battery charge waveform (8 A power source).

FIG. 9D is an exemplary embodiment of input capacitor waveform.

FIG. 9F is an exemplary embodiment of output capacitor waveform.

FIG. 10A is an exemplary embodiment of a table used to calculate the specified times for 0 to 7 groups of batteries connected in series.

FIG. 10B is an exemplary schematic circuit diagram for converting square waveform to sinusoidal waveform.

FIG. 10C is an exemplary schematic circuit diagram for converting DC to AC output.

FIG. 10D is an exemplary schematic circuit diagram for converting AC to DC input.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Battery to Load-Only Connections Using Para-Series

Figure 1B:
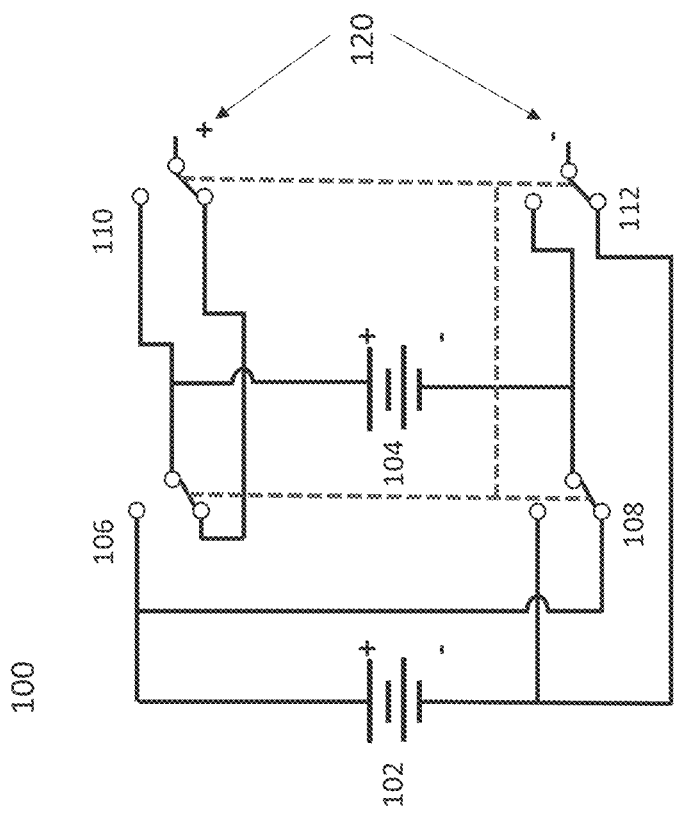
FIG. 1B is an exemplary embodiment of the para-series discharging method.
Figure 1A:
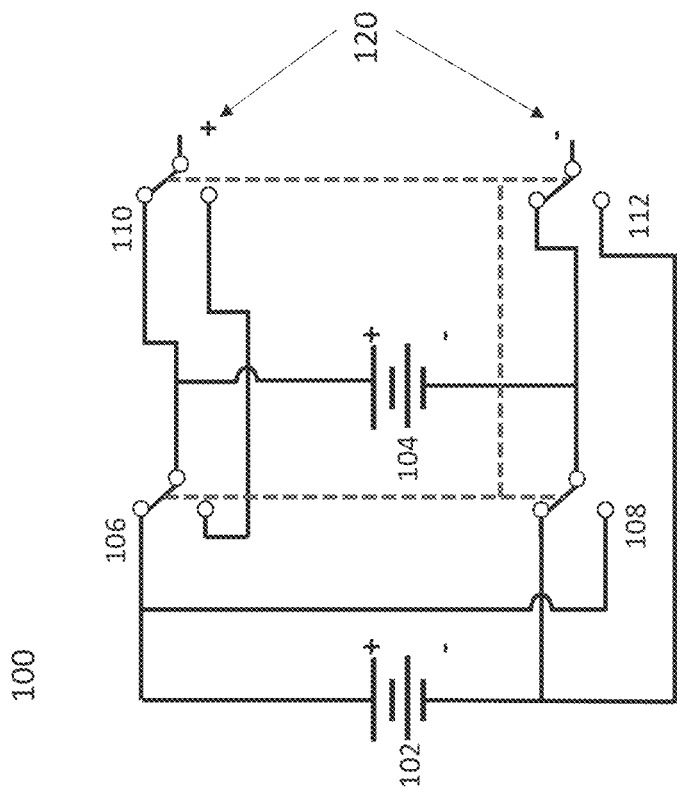
FIG. 1A is an exemplary embodiment of the para-series discharging method.

An exemplary embodiment may implement a "para-series" discharging method shown in FIG. 1. The first cycle may connect batteries in parallel with the load shown in FIG. 1A. The second cycle may connect batteries in series with the same load shown in FIG. 1B. The control unit may switch between the independent cycles at any desirable frequency to produce a desired average output voltage and amperage depending on the relative duration of each cycle. By quickly switching between a parallel and series configuration, the circuit may output an average of the series and parallel outputs. The output of the switching circuit may be adjusted by adjusting the phase frequency, or amount of time between switches. A higher voltage may be achieved by increasing the amount of time the circuit is in the series configuration.

An advantage of the para-series discharging embodiment is that it may enable an efficient discharge of all electrons stored in a non-rechargeable battery. In an exemplary embodiment shown in FIGS. 1A and 1B, when two non-rechargeable 4V 2 Ah batteries 102/104 are used to power a 2.5V 0.5 A output load 120, the batteries may be initially arranged in parallel (FIG. 1A) to the load as the 4V from the batteries may be sufficient to power the load 120 required from 2.5V load that may have a 0.5V dropout voltage. However, when the battery voltage drops below the dropout voltage of 3V, the batteries 102/104 may not subsequently discharge to the output load 120 as the current may not flow. The control device with a voltage comparator circuit may therefore activate switching to a suitable para-series ratio which will therefore enable the voltage to be a minimum voltage based on the required dropout voltage (3V). The control unit may activate switches 106, 108, 110, and 112 in order to switch between series and parallel configurations.

Referring to the parallel phase in exemplary FIG. 1A, an additional switch 108 may connect to the negative terminal of battery 104. During the parallel phase, switch 108 may be configured to connect to the negative terminal of battery 102. Thus, there may be a node at switch 108 connecting the negative terminals of the batteries 102 and 104. Further, the output may be connected to switches 110 and 112. In the parallel phase, switch 110 may be configured to connect the output 120 to the node created by the positive terminals of battery 102 and battery 104. At the same time, switch 112 may be configured to connect the negative terminal of output 120 to the node created by the negative terminals of battery 102 and battery 104. Thus, the positive terminals of the batteries and the positive terminal of the output are all connected, and the negative terminals of the batteries and the negative terminal of the output are also connected, and a parallel circuit may be formed.

Now referring to exemplary FIG. 1B, the circuit may be shown in a series configuration. The series configuration may take place in a different phase than the parallel configuration. In the series configuration, the switches 106, 108, 110, and 112 may all be switched in the opposite direction of the previous phase. The switches may be connected such that they may switch simultaneously. To form the series configuration, switch 106 and switch 110 may connect the positive terminal of battery 104 directly to the output 120. The negative terminal of battery 104 may be connected to the positive terminal of battery 102, via switch 108. The negative terminal of battery 102 may be connected to the output 120 via switch 112. The switches may be any one of many types of switches or interrupters. The switches may be flipped, or commuted, at the same time. The output signals (current and voltage) may depend on the commuting or switching time between the two phases.

Table 1 shows 7 possible scenarios:

TABLE 1

| Scenario | Battery (Voltage) | | | | Selected | |
| | Cell 1 102 | Cell 2 104 | Combined Parallel | Combined Series | Para-series ratio | Load 120 |
| --- | --- | --- | --- | --- | --- | --- |
| 1 | 4.0 | 4.0 | 4.0 | 8.0 V | 4.0 V at 100 percent | 3.0 V (2.5 V 0.5 A load + 0.5 V dropout voltage) |
| 2 | 3.5 | 3.5 | 3.5 | 7.0 V | 3.5 V at 100 percent | |
| 3 | 3.0 | 3.0 | 3.0 | 6.0 | 3.45 V at 85 percent | |
| 4 | 2.5 | 2.5 | 2.5 | 5.0 | 3.5 V at 67 percent | |
| 5 | 2.0 | 2.0 | 2.0 | 4.0 | 3.33 V at 33 percent | |
| 6 | 1.5 | 1.5 | 1.5 | 3.0 | 3 V at 100 percent | |
| 7 | 1.0 | 1.0 | 1.0 | 2.0 | Below dropout voltage | |

When the battery voltage drops to 2.5V at each battery in Scenario 4 in Table 1, the available voltage at the load may be increased to 3.5V by gradually adjusting the para-series ratio to 67 percent (67 percent parallel and 33 percent series). The increase in voltage provided to the load will reduce the remaining current stored in the batteries until there is no more electron charge remaining in the battery. The power required by the control device with the comparator circuit may need to be considered when designing the circuit but will generally be low and can be incorporated into the dropout voltage.

Batteries configured in a parallel arrangement may naturally balance since they are directly connected to each other. When two batteries are connected in series and have different SoC, the battery with the smaller capacity may empty before the larger one, resulting in a lower voltage across the smaller battery. In active balancing, the excess charge from one battery is transferred to another battery of low charge to equalize them. In prior art embodiments, active balancing is achieved by utilizing charge storing elements like capacitors and inductors.

Figure 4:
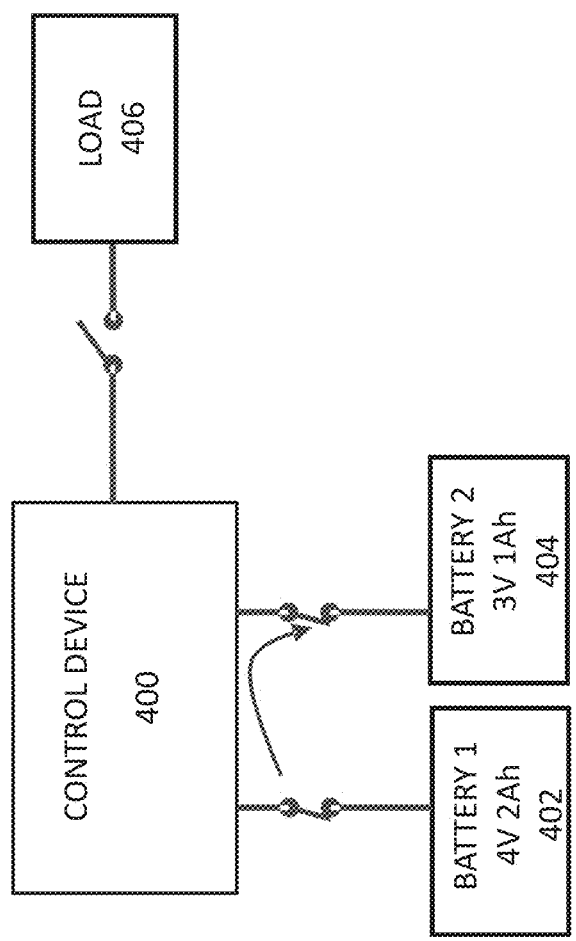
FIG. 4 is an exemplary embodiment of cell balancing using para-series discharging method.

In an exemplary embodiment shown in FIG. 4, two rechargeable 4V 2 Ah batteries 402/404 connected to the load 406 may be disconnected so that the first 4V 2 Ah rechargeable battery 402 may be connected to the other rechargeable battery 404 that has been depleted to 3.0V 1 Ah. The switching arrangement can be configured by the control device 400 which has a voltage comparator circuit such that the batteries may then be triggered by a control device 400 to disconnect with the load 406 and instead for the 4V 2 Ah battery 402 to be directly connected in parallel to the depleted 3.0V 1 Ah battery 404. This may result in cell balancing. The control device 400 may then be triggered to allow both batteries to be connected, in parallel or series, to discharge to the load. The energy required by the control device with comparator circuit and switches may need to be considered in such an embodiment and sized accordingly.

Para-Series Isolated Load Battery Charging

Figure 2A:
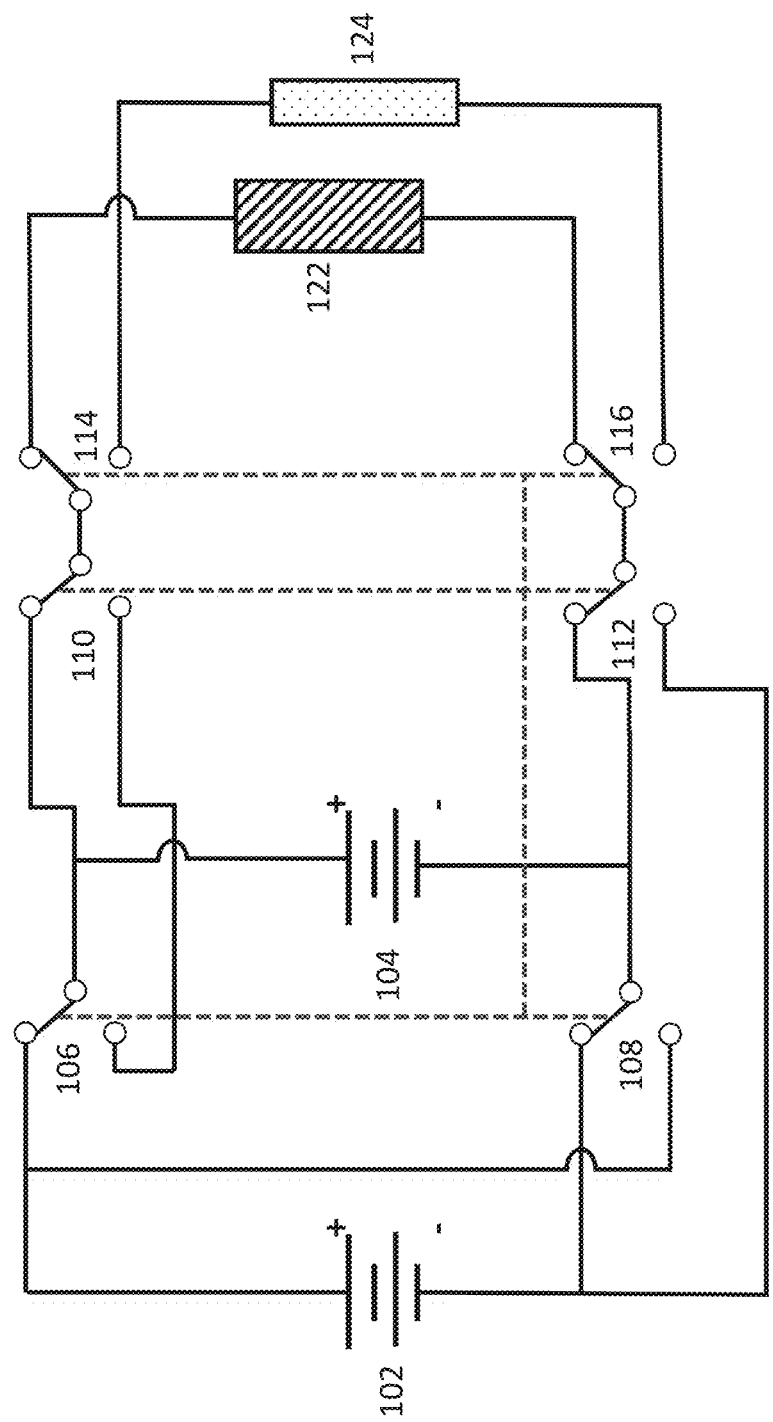
FIG. 2A is an exemplary embodiment of an energy storage system with isolated load.

An exemplary embodiment of the isolated load battery charging method is shown in FIG. 2A. A control device may alternate between two cycles where in a first exemplary cycle, the 16V 8 A solar photovoltaic source 122 charges the two 12V 5 Ah batteries 102/104 in parallel. In a second exemplary cycle, the control device may power the 24V 8 A load 124 by discharging the batteries 102/104 in series. In this exemplary embodiment, the load is isolated from the power source, and fast switching speeds of 50 to 60 hertz allows the simultaneous charging of the batteries while driving the load. During the first cycle, I_pv is charging to batteries 102/104 and during the second cycle I_load is discharging from batteries 102/104. An initial first cycle in parallel between a 12V renewable power source, such as a photovoltaic panel, and two 12V batteries may enable the circuit to power a 24V load as the second cycle discharges the two 12V in series, producing a pseudo sinewave (square waveform).

During the first cycle, the batteries 102/104 are connected in parallel to the power source where each of the two batteries receive 4 A each from the 8 A solar power source 500. Each battery may receive up to 4 Ah as it has a storage capacity of 5 Ah. During the second cycle, the batteries are connected in series to provide the combined 24V to the load as the current is available to drive the load of 8 A. Each battery of 12V can normally be charged to about 12.9V when fully charged and about 11.4V when fully discharged and when two 12V batteries 102/104 are configured in series it would therefore generate 24V required by the load 124.

Figure 5B:
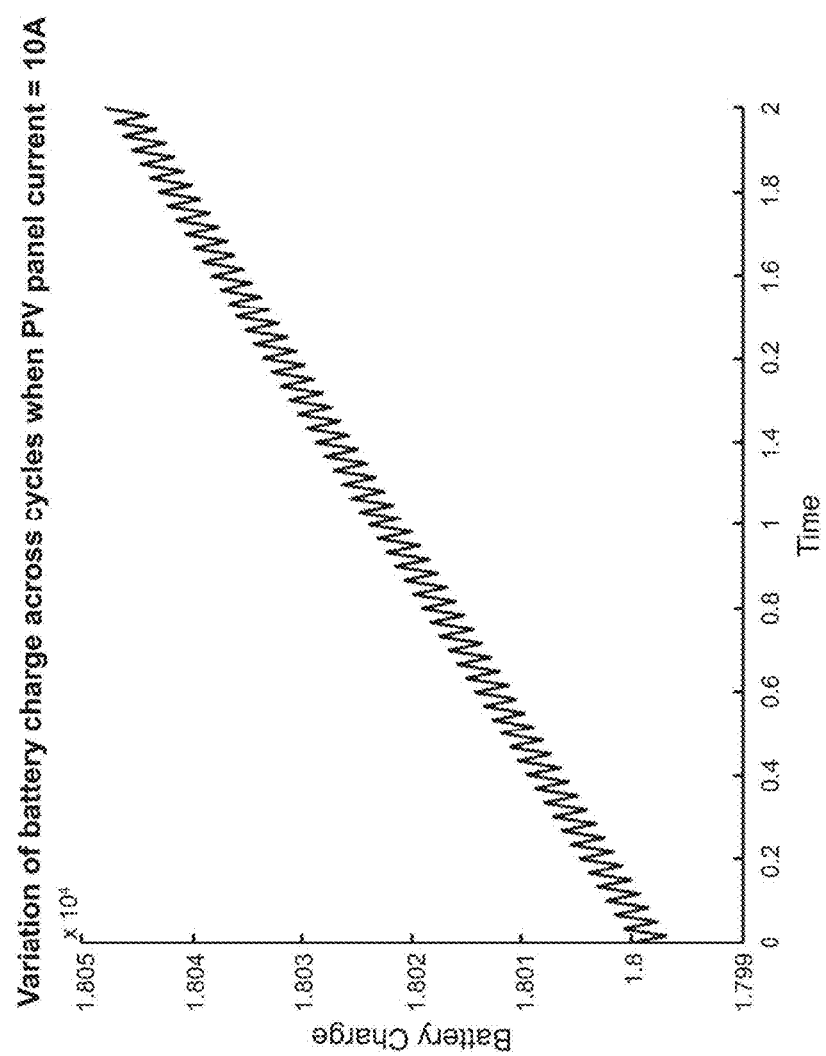
FIG. 5B is an exemplary embodiment of battery charge waveform (10 A power source).
Figure 5C:
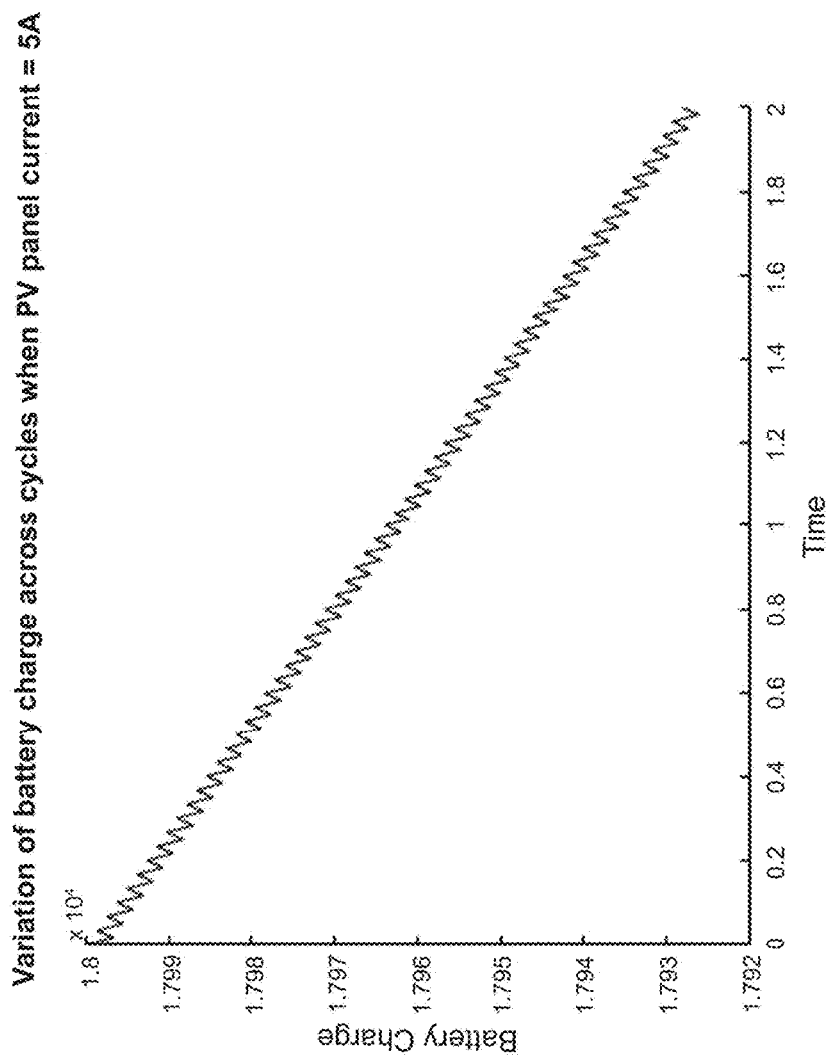
FIG. 5C is an exemplary embodiment of battery charge waveform (5 A power source).

FIG. 5A shows the SoC (in Coulombs) where the solar power source 122 is 8 A and the load 124 is also 8A. In another exemplary embodiment, the solar PV source 122 in FIG. 2A is 10 A and the load 124 amperage is 8 A the battery SoC may increase as shown in FIG. 5B. In a further exemplary embodiment, the solar PV source 122 in FIG. 2A is 5 A and the load amperage 124 is 8 A the battery SoC may decrease as shown in FIG. 5C.

Figure 2B:
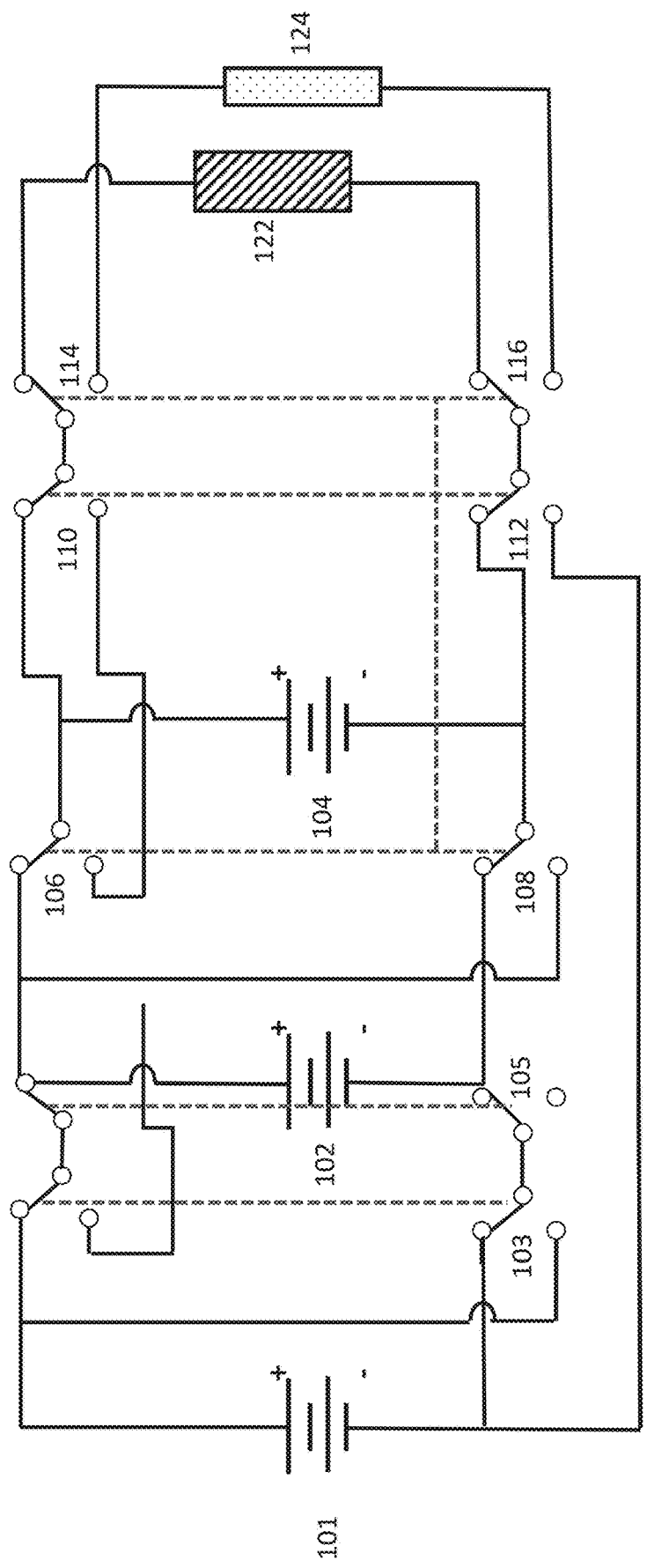
FIG. 2B is an exemplary embodiment of an energy storage system with isolated load.

In an exemplary embodiment shown in FIG. 2A, the solar PV source 122 is 20 A and the load 124 is 5 A where the batteries 102/104 may each receive 5 Ah each as the control unit may cut off the power source after this. Switches 114 and 116 may be additionally included in order to connect the circuit to either the solar PV source 122 or the load 124. In a further exemplary embodiment shown in FIG. 2B, the solar PV source 122 is 20 A and the load 124 is 5 A, where a third 12V 5 Ah battery 101 may be added to balance the circuit by the additional 5 Ah instead of cutting off the power source and where the load voltage may be maintained at 24V with a 50% duty cycle para-series ((12V+36V)/2) during the second cycle when the batteries are connected to the load. Additional switches 103 and 105 may also be included with the addition of battery 101. Voltage shifting enables a lower voltage solar panel to be coupled with batteries. An increase in batteries during the series phase when connected to the load may drain the batteries faster, as illustrated in Table 7. When solar panel voltage is reduced, more batteries may be added and used for their voltage, which may result in a faster drain of the batteries by the load. Any further number of batteries may be added using to store the excess energy produced by the power source.

Figure 6A:
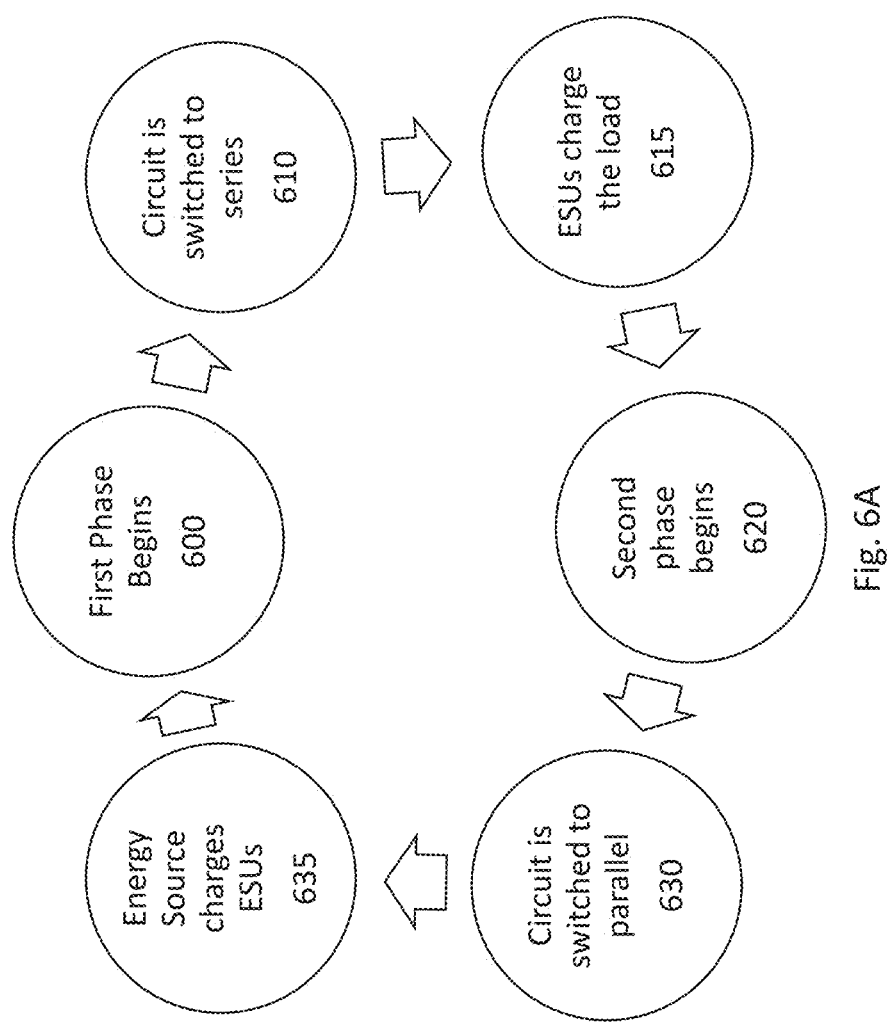
FIG. 6A is an exemplary embodiment of a method of implementing a switching circuit.
Figure 6B:
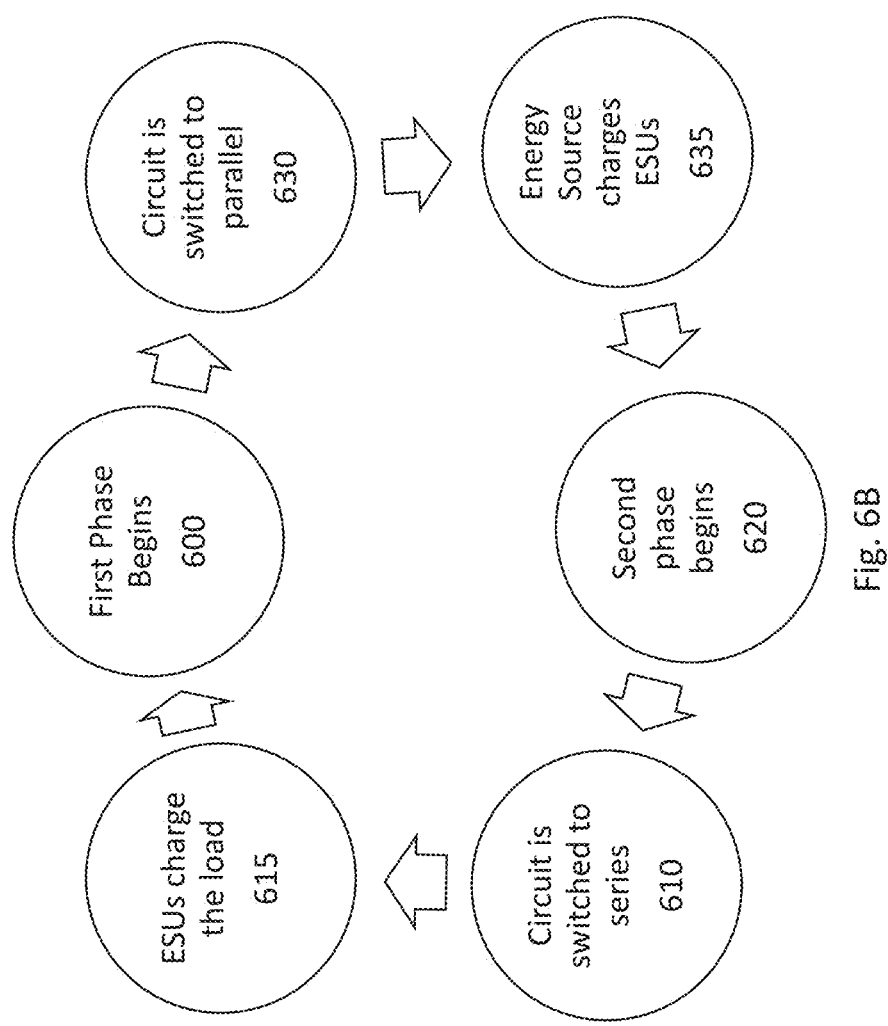
FIG. 6B is an exemplary embodiment of a method of implementing a switching circuit.

Referring now to the exemplary schematic flowchart in FIG. 6A, an exemplary embodiment may start the first phase in parallel to charge the batteries from the power source and the second phase in series to discharge the batteries to the load. The circuit may then be switched to series 610 in order for the ESUs to charge the load 615. Then, the second phase may begin 620. During the second phase 620, the circuit may be switched to parallel 630 in order for the energy source(s) to charge the ESUs. FIG. 6B shows another exemplary embodiment where the batteries may be fully charged and the first phase in series to discharge the batteries to the load and the second phase in parallel to charge the batteries from the power source. Thus, in FIG. 6B the circuits may be switched to parallel 630 during the first phase 600, and then switched to series 610 after the second phase 620 begins.

Thus, the two cycles are independent where the load may be isolated and discharged during the cycle when the battery is not connected to the power source. An advantage of the isolated load battery charging method is that it allows the battery to supply the entire voltage load. As a result, only the battery voltage may need to be higher than the load voltage and this may be achieved by a series connection of multiple batteries. Load isolation also allows for the simultaneous charging and discharging of the batteries, for example, at a speed of 60 Hz.

In another exemplary embodiment, the power source may also have minimum voltage with higher amperage to power a higher voltage load as the required voltage from the batteries will provide the additional voltage to the load. To enable a higher amperage from a solar power source embodiment to charge the batteries, the connecting wires may have to be increased proportionately in thickness to allow the increased current to pass through efficiently. By quickly switching the battery connection between the power source and load in independent separate cycles, the batteries may produce the maximum load voltage when connected during the second cycle when in series.

In a further exemplary embodiment of the isolated load battery charging method, the first cycle may connect batteries with a power source in parallel and a second cycle may connect the batteries with the load in parallel. In this exemplary case, the first phase and second phase could both be in the parallel-parallel arrangement as the first phase is isolated from the second phase. The first phase independently charges the batteries from the power source and the second phase connects the load to the batteries. By quickly switching the battery connection between the power source and load in independent separate cycles, the batteries may produce the minimum load voltage when connected in parallel during the second cycle. In a further exemplary embodiment, the first phase may be in parallel and the second phase may be in para-series arrangement to enable the load to receive the appropriate average voltage based on the relative duration between parallel and series.

The control unit may configure the relative duration of the first phase independent of the duration of the second phase. This may be achieved by adjusting the duty cycles of the first and second cycles relative positions during each phase. Adjusting the duty cycles of the first and second cycles will result in the charging phase and discharging phase to be respectively adjusted.

In an exemplary embodiment, $t_1$ may be the time spent in a first cycle in parallel and $t_2$ may be the time spent during the second cycle in series. Further, the time T may represent the period corresponding to the fundamental frequency, so T=1/fundamental frequency=$t_1$+$t_2$. If f(t) may represent the input signal, the mean value of a signal may then be calculated using the formula:

$$Mean(f(t)) = \frac{1}{T}\int_{(t-T)}^{t} f(t) \cdot dt \qquad \text{(Equation 1)}$$

Figure 7B:
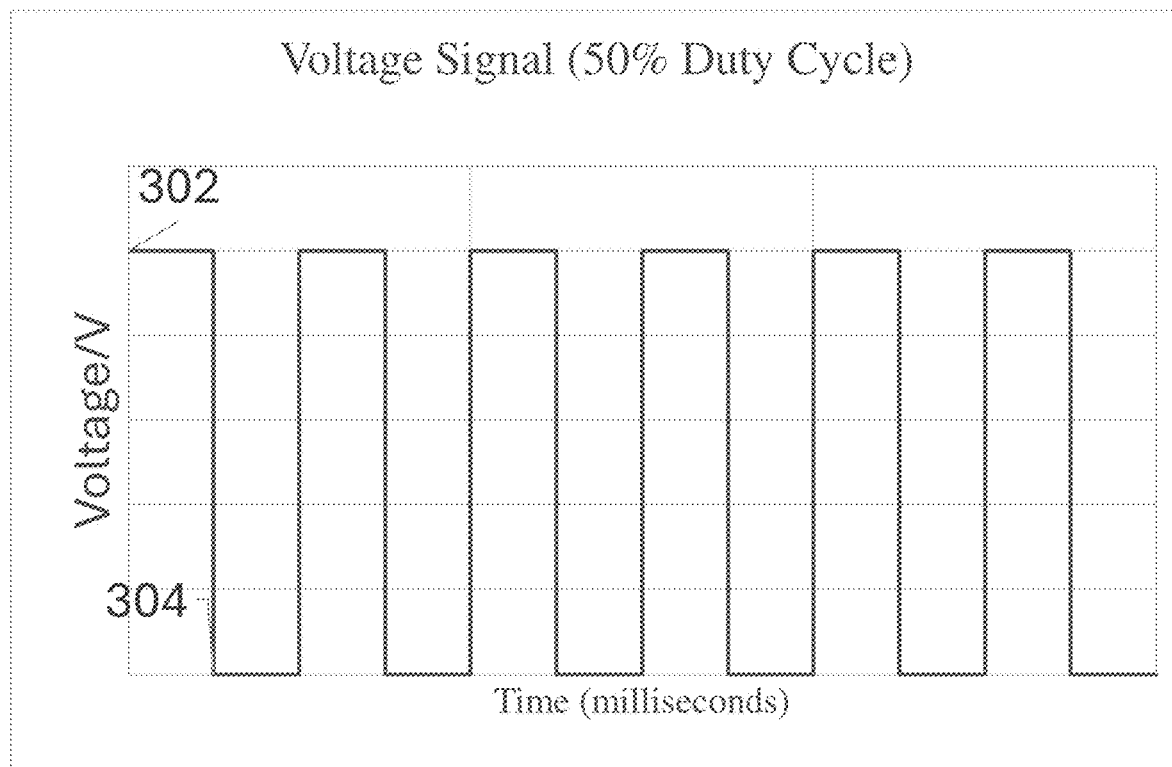
FIG. 7B is an exemplary embodiment of a voltage signal waveform.
Figure 7D:
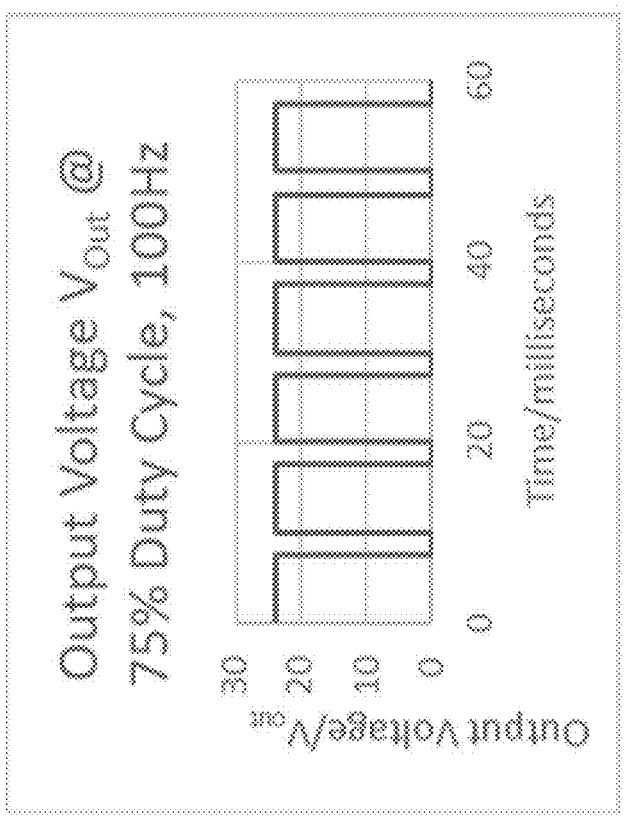
FIG. 7D is an exemplary embodiment of an output voltage waveform (25% duty cycle).
Figure 7C:
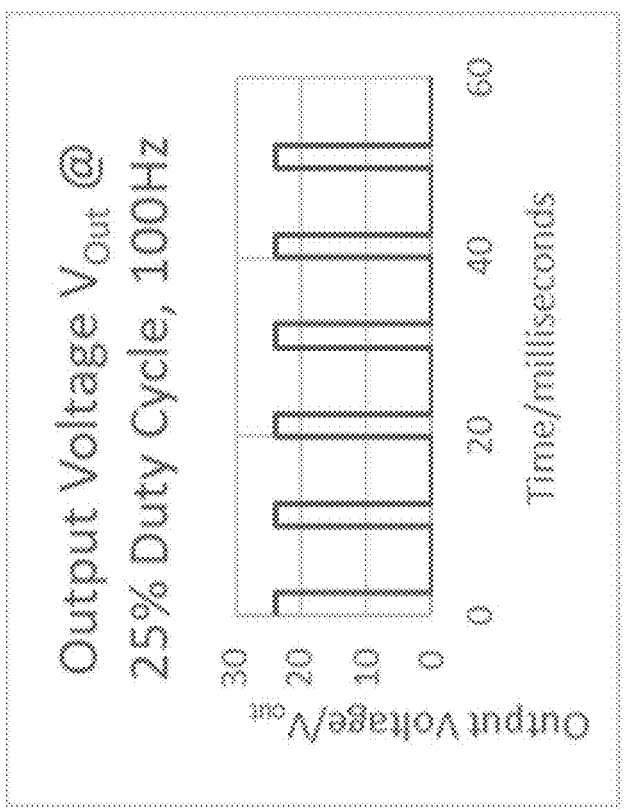
FIG. 7C is an exemplary embodiment of an output voltage waveform (50% duty cycle).

This formula may refer to the switching signal shown in exemplary FIGS. 7A-D. The signal, as illustrated in FIG. 7A, may be a square signal. FIG. 7A may be the output of an exemplary switching signal. The integral of the voltage (V) of the exemplary signal may produce the following equations.

$$V_{signal} = \frac{1}{T}\int_{0}^{t_1} V_{signal,On} \cdot dt + \frac{1}{T}\int_{t_1}^{t_1+t_2} V_{signal,Off} \cdot dt \qquad \text{(Equation 2)}$$

FIG. 7B may be the output of an exemplary voltage signal. The width of the horizontal line 304 may correspond to the time $t_1$. The width of horizontal line 302 may correspond to the time $t_2$.

Assuming that when the signal is "on" the batteries are charging during the first cycle in parallel, the integral of the voltage of the exemplary signal may produce the following equations:

$$V_{In} = \frac{1}{T} \cdot \int_{t_1}^{t_1+t_2} V_1 \cdot dt = \frac{1}{T} V_1 \cdot t_1 \qquad \text{(Equation 3)}$$

Assuming that when the signal is "off" the batteries are discharging during the second cycle in series, the integral of the voltage of the exemplary signal may produce the following equations:

$$V_{out} = \frac{1}{T} \cdot \int_{t_1}^{t_1+t_2} V_2 \cdot dt = \frac{1}{T} V_2 \cdot t_2 \qquad \text{(Equation 4)}$$

Where $V_{In}$ corresponds to $V_{signal,On}$ and is the first cycle charging voltage in parallel. FIG. 7A illustrates an exemplary $V_{signal}$. The output voltage corresponding to $V_{signal,Off}$ and the second cycle discharging voltage in series may be defined by $V_{Out}$.

In an exemplary case where $t_1=t_2$, the mean value of the output current may be found by $I_2/2$, and the mean output voltage may be $V_2/2$. The output voltage may therefore be stepped down.

The output load is determined by the second cycle $t_2$ when the load is connected to the battery in series. A battery system at a 100% duty cycle, where $t_1=0$ and $t_2=T$, $V_{out}=V_2$ and the circuit is only discharging in series. At a 50% duty cycle, where $t_1=0.5$ T and $t_2=0.5$ T, $V_{out}=0.5V_2$ and the circuit is charging and discharging at alternate cycles. The voltage signal of an exemplary 50% duty cycle is illustrated in FIG. 7B.

An exemplary embodiment may be at a 25% duty cycle, where $t_1=0.75$ T and $t_2=0.25$ T, $V_{out}=0.25V_2$ and the circuit is charging 75% of the time and discharging at 25% of the time. The output voltage of this exemplary embodiment is illustrated in the plot in FIG. 7C. In an exemplary embodiment, the amount of charge from the energy source during the parallel charging phase may exceed the amount discharged by the load during the series phase, so the batteries may gain charge over time. The amount of charge in the batteries may increase when the duty cycle is below 50% or when the amperage from the power source exceeds the load amperage. It may be contemplated that when the battery reaches a certain level, the excess charge is prevented from reaching the battery to reduce the risk of overcharging. In an alternate exemplary embodiment, an energy source may be chosen which charges an amount of energy equal to the amount discharged during the series phase. In this alternate exemplary embodiment, the energy storage units may constantly hold the same amount of charge.

An exemplary embodiment may be at a 75% duty cycle, where $t_1=0.75$ T and $t_2=0.25$ T, $V_{out}=0.25V_2$ and the circuit is charging 25% of the time and discharging at 75% of the time. The output voltage of this exemplary embodiment is illustrated in the plot in FIG. 7D. The amount of charge in the batteries may decrease when the duty cycle is above 50% or when the amperage from the power source is less than the load amperage. As the incoming battery charge is less than the outgoing discharge, the battery will be depleted quickly. At above 50% duty cycle, the battery may be combined with the power source to provide a single source of energy to the load, due to the continuous charging and discharging cycles.

A 50% duty cycle exemplary embodiment may therefore be supplemented by a second set of power source and batteries to ensure a constant supply of energy to the load without interruption. An exemplary isolated load battery charging method, with two 12V batteries, may produce a square wave voltage output of 0V and 24V during the series discharge cycle and therefore complementing with another system during the cycle when no energy is provided to the load may ensure a constant voltage of 24V to the load using both sets of batteries. This output voltage may therefore be stepped-up.

Figure 8A:
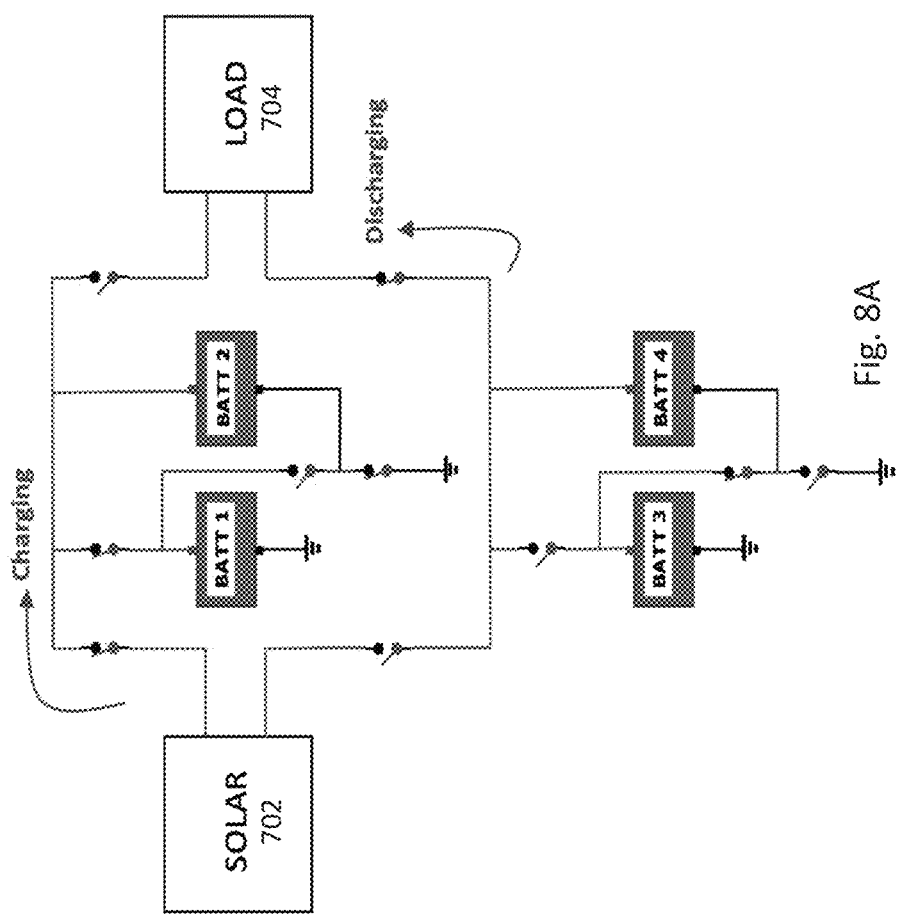
FIG. 8A is an exemplary embodiment of an energy storage system configured to implement an exemplary isolated load charging system using 4 batteries.

An exemplary embodiment may implement a second two-phase isolated load battery charging method, as shown in FIG. 8A, using a 50% duty cycle where a second set of batteries, which is also at a 50% duty cycle, that may provide current to the load during the phase when the first isolated load circuit is connected to the power source 702 when there is no current supplied to the load. When the first set of batteries (BATT 1 and BATT 2) is charging, the second set (BATT 3 and BATT 4) may discharge to the load 704, and vice versa.

Another exemplary embodiment shown in FIG. 8B may use 8 batteries with 4 batteries in Set A and another 4 batteries in Set B where each set is charging and discharging in complementary phases. A further exemplary embodiment may implement a four-phase input illustrated in FIG. 8B where batteries A1, B1, C1 and D1 may be charging from a solar power source 702 and where the batteries A2, B2, C2 and D2 may be discharging to the load 704 where each is providing, for example, at a 25% series duty cycle each to contribute a steady 100% charge to the load.

Figure 9:
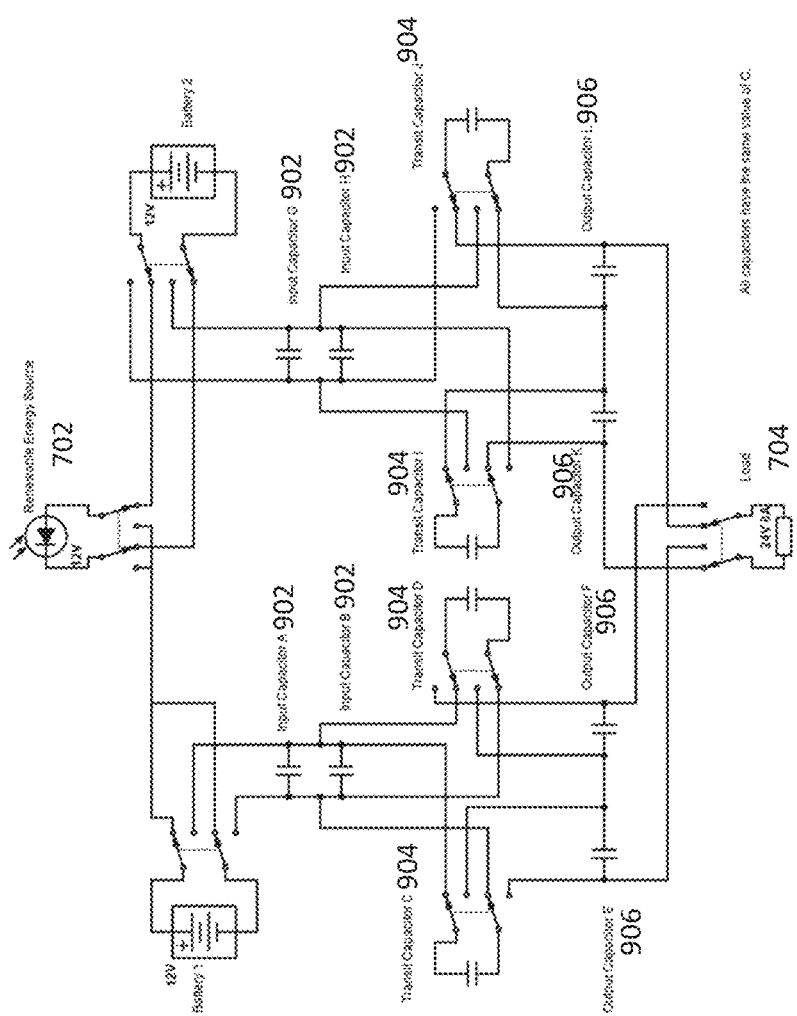
FIG. 9 is an exemplary embodiment of an energy storage system configured to implement an exemplary isolated load charging system supplying constant load voltage.

The second set of batteries may be of a different type of energy storage units, such as a capacitor, and may provide a different voltage or current as shown in FIG. 9. Each energy storage unit, if not charged initially, must receive a charge in the first phase to be discharged during the second phase. Each battery may be of a similar type under each respective energy storage set.

FIG. 9 illustrates an exemplary embodiment using two isolated circuits, Circuits 1 and 2, that are connected to the same power source 702 and load 704. Each individual circuit may include a single battery 12V 8 Ah which is connected to a pair of input capacitors 902 in parallel configuration so that the input capacitors 902 receive the 12V. Each of the input capacitors 902 in their respective circuits are further connected to each transit capacitor 904 in a parallel configuration such that each transit capacitor 904 (D) receives the 12V from the respective input capacitor 902 (B). The output capacitors 906 are connected to the transit capacitors 904 (which are now disconnected from the input capacitors 902) in parallel configuration so that the charge flows to the individual output capacitor 906. Each output capacitor 906 (E) is also connected to the other output capacitor 906 (F) in series configuration so that the load receives 24V. Each of Circuit 1 and 2 may have two phases such that when the battery is being charged in Phase 1 while the capacitor (which was charged in earlier Phase 2, for example) discharges to the load 704 at the same Phase 1. During each of the Phase 1 or 2 of the respective circuit, only the input capacitors 902 or output capacitors 906 are connected to the load 704 in alternative cycles but not both. The output is therefore isolated from the input stage. The input is also isolated from the output stage when charging from a renewable power source 702. The load 704 and the renewable energy source 702 are shared between the 2 circuits such that when the load 704 is connected to Circuit 1, the renewable energy 702 is connected to Circuit 2, and vice versa. Each Circuit therefore has 3 stages:

Stage 1: Charging stage—to charge the battery(s) from solar or wind energy source.
Stage 2: Discharging of battery stage—to discharge from the battery to a pair of input capacitors.
Stage 3: Discharging to load stage—to discharge from the output capacitors to the load.

When the battery is charging, it stores the power given by the renewable energy source 702 in the form of charge as per the following equation:

$$q_i(t) = q_i(t-1) + \int_{t-1}^{t} i_{renewable} dt (i \in (1, 2))$$

Where:
- $q_i(t)$: Charge in battery i at time t (i∈(1,2))
- $q_j(t)$: Charge in capacitor j at time t (j∈(A, B, C, D, E, F, G, H, I, J, K, L)
- $V_k$: Voltage across component (k∈(1, 2, A, B, C, D, E, F, G, H, I, J, K, L)
- $i_k$: Current drawn by component (k∈(renewable, 1, 2, A, B, C, D, E, F, G, H, I, J, K, L, load)
- C: Capacitance value of the capacitors When the battery is connected to the input and transit capacitors 902/904, each capacitor is in parallel to the battery and charges to a capacity of voltage supplied by the battery multiplied by the capacitance value:

$$q_i(t) = q_i(t-1) + \left(4V_iC - \sum_j q_j(t-1)\right)$$

When the input capacitors 902 are disconnected, their charges do not change in that cycle:

$$q_j(t) = q_j(t-1)$$

When the input capacitors 902 are connected to the battery, their charge becomes equal to the voltage across them times the capacitance value:

$$q_j(t) = V_iC$$

When the transit capacitors 904 are connected to the output capacitors 906, the transit capacitors 904 and output capacitors 906 form a system with the equivalent capacitance of C and the charge present gets redistributed amongst them equally according to the charge conservation law. The charge drawn by the load is drawn from all capacitors equally:

$$q_j(t) = \left(\sum_j q_j(t-1)\right)/4 - i_{load}cycleTime/4$$

When the transit capacitors 904 are connected to the battery, their charge becomes equal to the voltage across them times the capacitance value as:

$$q_j(t) = V_iC$$

When the output capacitors 906 are disconnected, their charges do not change in that cycle:

$$q_j(t) = q_j(t-1)$$

When the output capacitors 906 are connected to the transit capacitors 904 and the load 704, the transit capacitors 904 and output capacitors 906 form a system with the equivalent capacitance of C and the charge present gets redistributed amongst them equally according to the charge conservation law. The charge drawn by the load is drawn from all capacitors equally:

$$q_j(t) = \left(\sum_j q_j(t-1)\right)/4 - i_{load}cycleTime/4$$

FIG. 9A shows the SoC where the current from the renewable power source (8 A) is equal to the load requirement (8 A), charge on both the batteries becomes constant in the steady state with oscillations around the mean value.

Figure 9B:
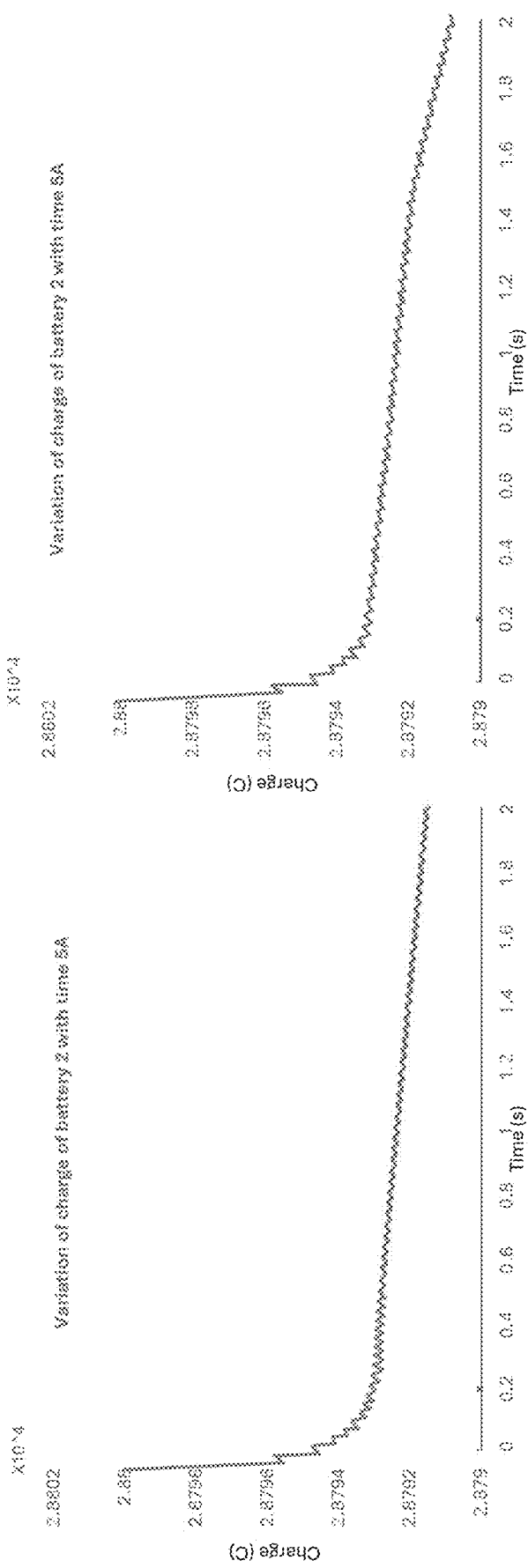
FIG. 9B is an exemplary embodiment of a battery charge waveform (10 A power source).

FIG. 9B shows the SoC where the current from the power source (5 A) is less than the load requirement (8 A), charge on both the batteries decrease with time with oscillations around the decreasing mean value.

Figure 9C:
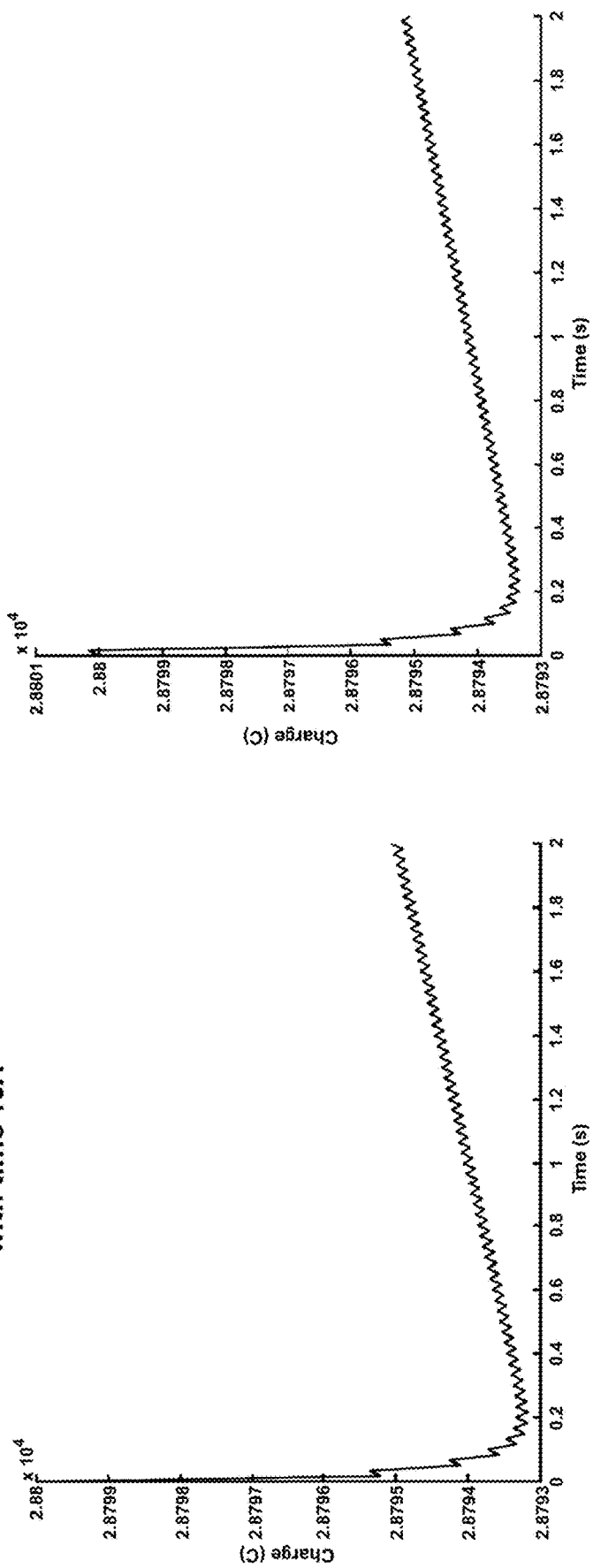
FIG. 9C is an exemplary embodiment of a battery charge waveform (5 A power source).

FIG. 9C shows the SoC where the current from the power source (10 A) is higher than the load requirement (8 A), charge on both the batteries increases in the steady state with oscillations around the increasing mean value.

Figure 9E:
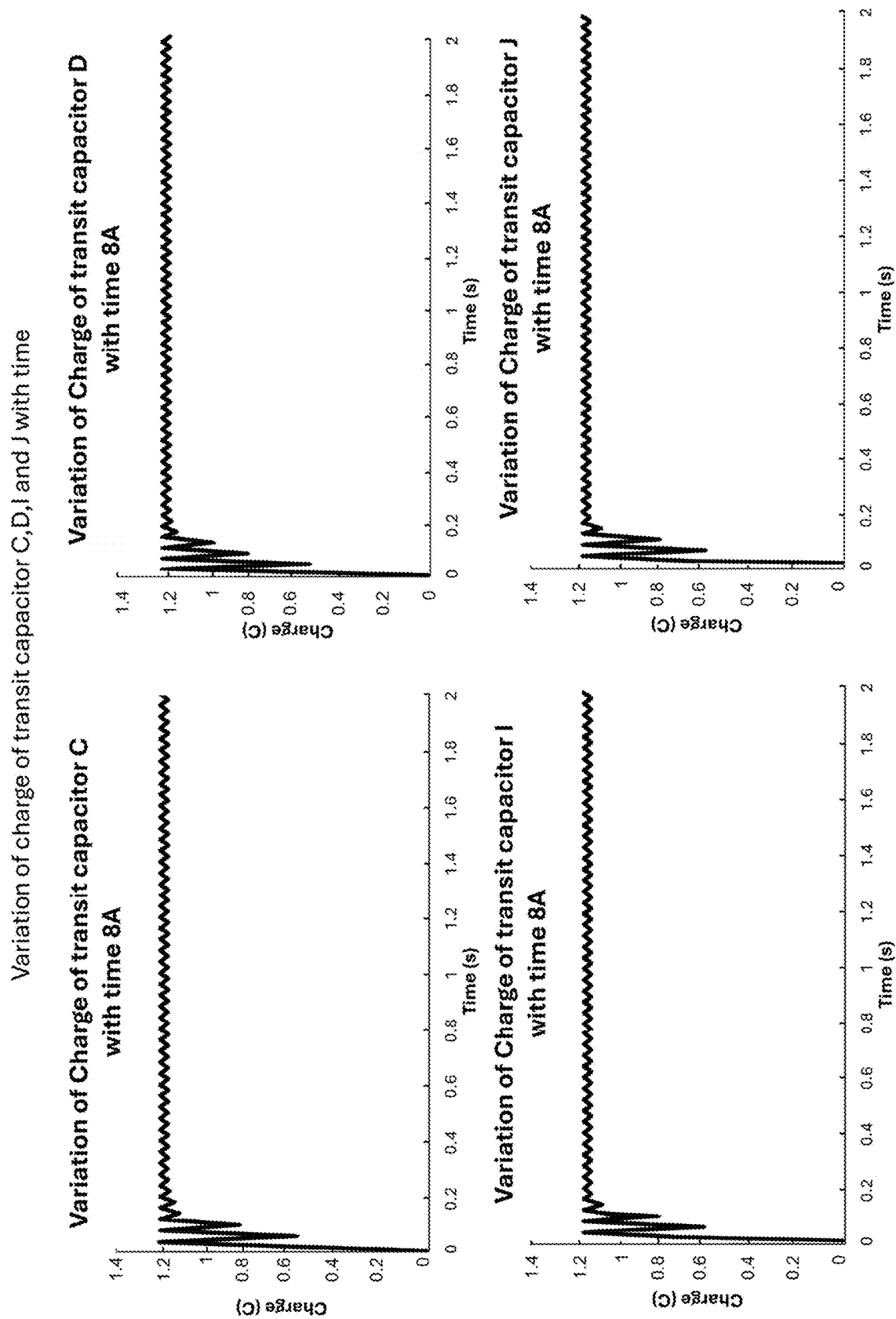
FIG. 9E is an exemplary embodiment of transit capacitor waveform.

The variations of charge of input, transit and output capacitors are also plotted in FIGS. 9D, 9E and 9F respectively, for a steady state when the power source and load are the same at 8A and illustrates that the capacitors reach steady charge rapidly.

The following Table 2 illustrates energy loss and gain in batteries after $\frac{1}{60}^{th}$ of a second:

TABLE 2

| Source | Battery (Energy Loss/Gain) (in joules) | | | Load |
|---|---|---|---|---|
| Amp | In | Out | Net | Amp |
| 5A | +2 | −3.2 | −1.2 | |
| 8A | +3.2 | −3.2 | 0 | 8 A |
| 10A | +4 | −3.2 | +0.8 | |

The control unit may select a switching time based on rotations per second, or any other measurement of time. There may be any number of switches or rotations per second. The control unit may configure the circuit to be in one phase much longer than the other phase. The phases may not be in equal lengths. By changing the relative proportion of time spent in the phases, the output voltage may be altered. Additionally, the control unit may be set to initially keep the circuit in a specific state. For example, the control unit may be configured to start in the parallel phase until the energy storage units become fully charged. The control unit may then begin the cycle of switching.

As the load is isolated, a portion of the output that is not required by the load device may be redirected to power another system or battery. An exemplary isolated load battery charging method may thus provide flexibility to redirect current by adjusting the duration of the first cycle (when the battery is being charged) relative to the second cycle (when the battery is discharged).

Since an exemplary isolated load battery charging method may implement steady state of charging the batteries while discharging to the load at the same time, the batteries may not become fully depleted. This allows for the use of common battery types, such as lead-acid and lithium batteries, which are often damaged when 100% of their capacity is used.

The energy to supply the load may be designed as desired without any regard to the power source. For example, when designing a load of 12V, only the battery design depends on the combined voltage of the batteries that are connected in series which must match the load voltage of 12V. The renewable power source amperage may however need to match the load amperage. Where the battery SoC is low, it should ideally be set to 0% duty load so as to enable the batteries to be recharged sufficiently in parallel mode. However, when the battery has a low amperage (or capacity) and the renewable power source amperage is high, the full current may not pass through to the load.

Multi-Battery Isolated Load Charging Method

Batteries and energy storage systems are typically limited by their physical topology. An exemplary multi-battery isolated load charging method described herein may use the logical topology (links) in addition to the physical topology (nodes) found in an exemplary switching fabric method that enables flexibility through the digitization of batteries by combining the hardware together with the software.

The nodes are the positive and negative terminal of each battery. The nodes may also be positive and negative terminals of power source and electronic device where all positive terminals may be connected to a single host or plate or printed circuit board. There may be one host (Host 1) to hold all the positive plates together and another host (Host 2) to hold all the negative plates together. Host 1 may include a plate or a printed circuit board may be connected to Host 2 including another plate or printed circuit board. There may be a number of ways to enable the nodes from a positive plate to be connected to a node from a negative plate. One exemplary embodiment may have a connection on/off switch for the positive plate connection (primary gate) which may be connected to a secondary gate based on the vector. Thus, using graph theory it may be possible to identify the shortest possible method for connecting the primary gate to the secondary gate while traveling through multiple additional nodes.

The nodes of each of Host 1 and Host 2 may be connected by a circuit. Each individual photovoltaic cell in the solar PV system may also represent a node to be connected to Hosts 1 and 2. Electronic components such as resistors, capacitors, comparators, transistors, diodes and inductors may also be nodes.

The links are the circuits on the printed circuit boards which are initially connected to the power source, load, batteries, and other electronic components. The circuit in the link is interrupted by the switches which are turned off initially until a connection is required.

The software control unit may select each battery to be of a similar type under each respective energy storage set or phase and connected only by appropriate rule such as the law of thermodynamics to allow the energy flow. For example, it may be contemplated that a large number of batteries are connected where each battery may receive a charge in the first phase in order to be discharged during the second phase. The software control unit may enable a series or parallel connection of all or some of the batteries in an energy storage compartment and which may be further connected to any number of power sources and to any number of output devices.

The software control unit may connect a large number of batteries where any smaller portion of the batteries, as required, may receive charge from a 120V or 240V sine wave power source through synchronized charging of these batteries. The software control unit may also connect the batteries in one phase to connect to the power source and another phase to be connected to the load while using another set of batteries to mirror or complement the first set to ensure constant output energy to the load. The software control unit may also convert the square wave output load to a 120V or 240V RMS sine wave with the required number of batteries to produce AC output directly at a desired frequency, such as 50 Hz or 60 Hz. The software control unit may alternatively disconnect the battery from the load to enable cell balancing or alternatively select another group of batteries to discharge to the load while it enables another group of batteries for cell balancing simultaneously. The software control unit may further enable the power source voltage to be stepped-up or down by connecting to a number of batteries as required or by switching the relative duration of charging and discharging phase.

An exemplary embodiment of a multi-battery isolated load battery charging circuit system using 3 batteries, Battery A, Battery B and Battery C may be described for illustrative purposes. It should be noted that the number of batteries indicated is not a limitation as the same principle can be applied to any number of batteries. In this example, during the first cycle, the batteries are configured in parallel and attached to the renewable power source and during the second cycle, the same batteries (or any number of batteries as selected) can be arranged in series to power the required load.

This exemplary embodiment may implement two hosts, Host 1 and Host 2. Host 1 is a plate that connects the positive terminals of the batteries and Host 2 is a plate that connects the negative terminals of each battery. Further, each of the positive terminals (A+, B+, and C+) is an individual logic switch, and each of the negative terminals (A−, B−, and C−) is an individual logic switch.

In an exemplary embodiment, the A+ logic switch may be on or off or connected to either any of the other positive terminal switches or negative terminal switches, to the positive or negative terminals of the renewable energy source, or to the load.

Table 3 shows 6 possible switching connections of Terminal A+ in this exemplary embodiment.

TABLE 3

| Switch | Connection Type | Method | Comments |
|---|---|---|---|
| Position 1 | Off | No connections | Disallows Battery A to be connected within the battery storage system |
| Position 2 | Parallel battery connection | Parallel connection to terminal B+ or C+ | Allows Battery A to be connected to Battery, B or C in parallel |
| Position 3 | Series battery connection | Series connection to B− or C− | Allows Battery A to be connected to Battery B or C in series |
| Position 4 | Solar connection | Connects to the positive solar terminal | Allows Battery A to be connected with the solar connection in parallel in conjunction with Position 2, if required |
| Position 5 | Load connection | Connects to the positive load terminal | Allows Battery A to be connected to the load in conjunction with Position 3, if required |
| Position 6 | Load connection | Connects to the negative load (for inverted connection) | The inverted connection allows for negative voltage to produce AC sine wave |

Table 4 shows 6 possible switching connections of Terminal A− in this exemplary embodiment.

TABLE 4

| Switch | Connection Type | Method | Comments |
|---|---|---|---|
| Position 1 | Off | No connections | Disallows Battery A to be connected within the battery storage system |
| Position 2 | Parallel battery connection | Parallel connections to terminal B− or C− | Allows Battery A to be connected to Battery, B or C in parallel |

TABLE 4-continued

| Switch | Connection Type | Method | Comments |
|---|---|---|---|
| Position 3 | Series battery connection | Series connections to terminal B+ or C+ | Allows Battery A to be connected to Battery B or C in series |
| Position 4 | Solar connection | Connects to the positive solar terminal | Allows Battery A to be connected with the solar connection in parallel in conjunction with Position 2, if required |
| Position 5 | Load connection | Connects to the negative load terminal | Allows Battery A to be connected to the load in conjunction with Position 3, if required |
| Position 6 | Load connection | Connects to the positive load (for inverted connection) | The inverted connection allows for negative voltage to produce AC sine wave |

Table 5 illustrates 9 possible programming algorithms that can be performed by combining Host 1 and Host 2 of the 3-battery energy storage system/device where individual logic switches are controlled by a user or software code.

TABLE 5

| Program or Logic sequence Number | Outcome desired | Output | Battery A Position | Battery B Position | Battery C Position |
|---|---|---|---|---|---|
| 1 | 3 batteries in series to discharge to a load | 12 V positive | 5 & 3 | 5 & 3 | 5 & 3 |
| 2 | 3 batteries in series to discharge to a load (for AC half cycle) | 12 V negative | 6 & 3 | 6 & 3 | 6 & 3 |
| 3 | 3 batteries in parallel to charge from solar power | 6 A/3 batteries = 2 A per battery | 4 & 2 | 4 & 2 | 4 & 2 |
| 4 | 2 batteries in series to discharge to a load | 8 V positive | 1 | 5 & 3 | 5 & 3 |
| 5 | 3 batteries in series to discharge to a load (for AC half cycle) | 8 V negative | 1 | 6 & 3 | 6 & 3 |
| 6 | 3 batteries in parallel to charge from solar power | 6 A/2 batteries = 3 Ah per battery | 1 | 4 & 2 | 4 & 2 |
| 7 | 1 battery in series to discharge to a load | 4 V positive | 1 | 1 | 5 & 3 |
| 8 | 1 battery in series to discharge to a load (for AC half cycle) | 4 V negative | 1 | 1 | 6 & 3 |
| 9 | 1 battery in parallel to charge from solar power | 6 A/1 batteries = 6 Ah per battery | 1 | 1 | 4 & 2 |

The software control unit executing corresponding software code or machine instructions may determine the most efficient method to deliver the load. For example, the software control unit may determine that the most efficient method is to complement with a second or third system and so forth, to enable the load to receive a steady charge which may depend on the duty cycle. The software control unit may determine, for example, using a comparator circuit, if there is a battery in the individual compartment by determining any incoming voltage of each cell. Once the software control unit confirms the presence of a cell, the software control unit may determine if each cell is ready for discharging and charging mode by matching individual cells of the same voltage and amperage for the purposes of preparing for the discharging phase to drive the load or to balance unbalanced cells in the battery storage. Similarly, the software control unit may determine if the battery voltage when combined is large enough to power the overall load. If the voltage is not large enough, the software control unit may select additional batteries to alter the voltage to provide a large enough voltage. Through the switching fabric, the hardware and software can be combined to ensure that there is sufficient power to drive the load.

In an exemplary embodiment, the switches may be transistors, such as, for example, MOSFETs, and may have I$^2$C capability such that each switch can become a controller. The software controller may simultaneously change the mode of all the other controllers. An exemplary embodiment may implement a multi-controller system that allows more than one controller to communicate with the hosts through, for example, a smartphone application, an IoT device, the cloud, and the like.

An exemplary embodiment may balance multiple connected batteries. In a series configuration, current will not flow once the output voltage of the series circuit matches the load voltage. An exemplary embodiment provides a method and configuration for balancing the batteries to maximize capacity and service life of the batteries by working to maintain equivalent state-of-charge of every cell, to the degree possible given their different capacities, over the widest possible range.

DC to AC Output

A sinusoidal waveform may be created from the isolated load battery charging method that produces a square waveform. In an exemplary embodiment using multiple batteries, each individual battery may be connected in series or parallel to other batteries when it is connected to the load such that the load voltage may form a sinusoidal waveform at specified times. This is implemented by switching between varying number of batteries at the correct times to generate the sinusoidal waveform. The remaining batteries not contributing to the AC waveform during the second cycle when connected to the load, are connected in parallel or not connected at all.

Table 6 illustrates an exemplary multi-battery embodiment including 12V batteries where there are 10 batteries available to be configured in series in timed steps:

TABLE 6

| Step | Time | Batteries configured in Series | Voltage |
|---|---|---|---|
| 0 | 0.000000 | 0 | 0 |
| 1 | 0.000319 | 1 | 12 |
| 2 | 0.000641 | 2 | 24 |
| 3 | 0.000970 | 3 | 36 |
| 4 | 0.001310 | 4 | 48 |
| 5 | 0.001667 | 5 | 60 |
| 6 | 0.002048 | 6 | 72 |
| 7 | 0.002468 | 7 | 84 |
| 8 | 0.002952 | 8 | 96 |
| 9 | 0.003564 | 9 | 108 |
| 10 | 0.005000 | 10 | 120 |

The correct times to generate the waveform for the negative voltages may be formed using H-bridge with timed switching which will result in the combined voltage in the negative range.

Figure 10A:
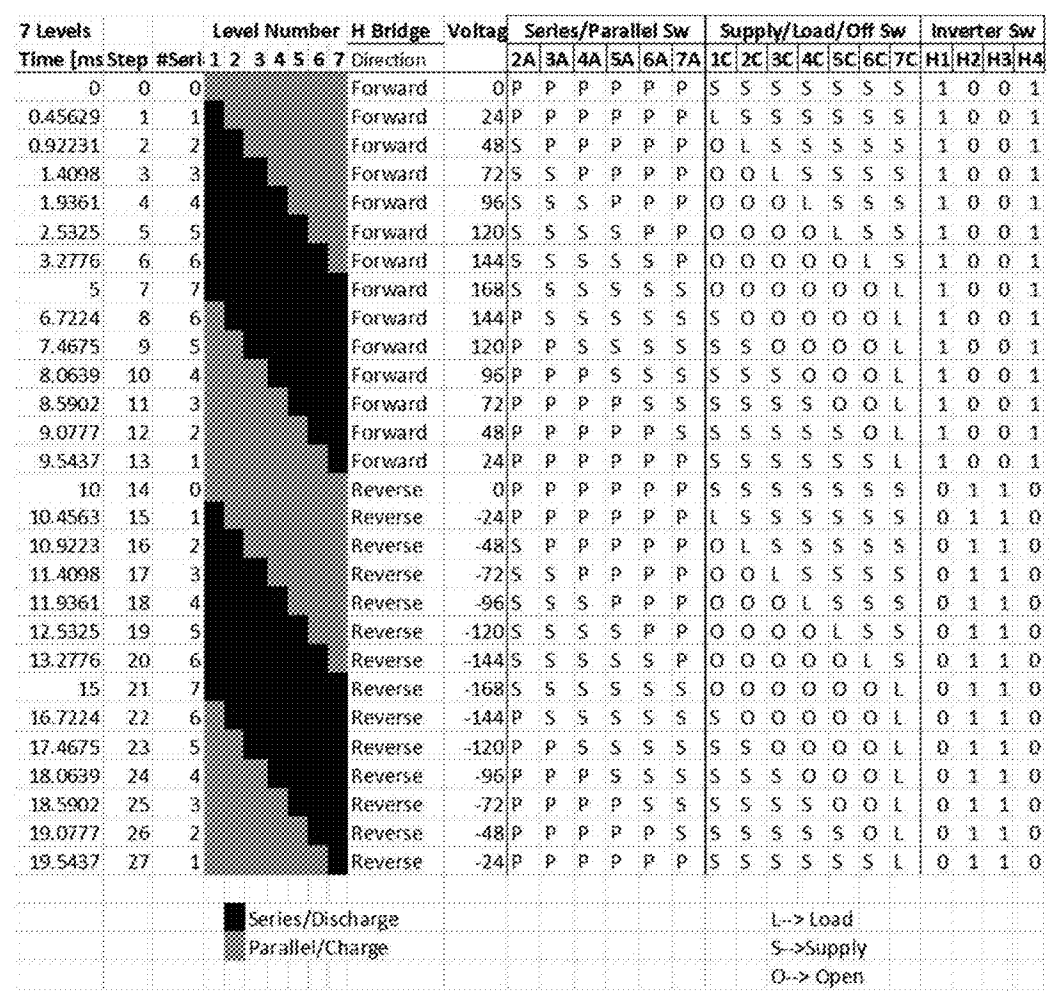

In the United States, the AC from the grid is sinusoidal waveform at 60 Hz that produces 120 VAC which is the root mean square value (RMS), which corresponds to a peak of 168V. A corresponding sinusoidal waveform may be produced in an exemplary embodiment using a multi-battery set of 10 batteries of 24V where 7 batteries may be connected to produce 168V during the second cycle using timed circuits as shown in FIG. 10A where Phase A refers to the positive voltage and Phase B refers to the negative voltage using an H-bridge connection.

FIG. 10B shows the sinusoidal waveform produced using logic switches.

An exemplary circuit diagram using 7 batteries of 24V each is shown in FIG. 10C where the blocks labeled "battery_series . . . " each may contain multiple batteries, such as, for example, 20 batteries in series at 1.2V each.

AC Input to Charge Batteries

Renewable power such as solar and wind is only available during certain periods resulting in power generated from renewable power source being intermittent. During periods of intermittency, there may be benefit in charging batteries efficiently using the AC power from the grid electricity.

An exemplary circuit diagram in FIG. 10D shows the implementation of a sinusoidal AC power source from the grid that may be used to charge 7 batteries of 24V using the 120V RMS sine waveform at several steps. The incoming AC voltage is therefore charging a single battery or a set of batteries in a synchronized waveform that follows the sinusoidal waveform. Using voltage comparators, when incoming AC voltage is 24V, 1 battery of 24V will be charged. Similarly, 3, 5 and 7 batteries are charged when the incoming AC voltage is 72V, 120V and 168V respectively.

During the duration of a single step in the sequence, there is some amount of voltage variation that reaches the batteries, as it is following the AC waveform from the supply. Thus, for instance, at the start of the first step or phase, the voltage is 24 V, but at the end it is 48V. The average voltage is thus 36V. Generally, it is desirable to charge at slightly higher voltage than the battery supplies. If this voltage level proves to be too high, an adjustment in the timings of the switches can be used to set the batteries to correspondingly lower points in the waveform.

In an exemplary embodiment for illustrative purposes, 100 batteries may be configured in the system or a battery-box using Host 1 and Host 2. In this example, each battery may be 4V and 4 Ah, the power source may be a 6V 60 A solar panel, and the output load may be 400V 60 A, to provide 24,000 Watts. When charging in parallel, the batteries can charge at 0.6 Ah (60 A divided by 100 batteries), thus charging each 4 Ah battery fully in 6.7 hours (4.0 Ah divided by 0.6 Ah). When in the series discharging phase, the load may be up to 400 Volts (4V per battery multiplied by 100 batteries). In this exemplary embodiment, each battery has 0.6 Ah. Thus, the system may power the load for approximately 30 seconds consecutively in the second phase.

Table 7 illustrates 12 scenarios using the battery-box of 100 batteries of 4V 4 Ah:

TABLE 7

| Case | Number of Batteries | Battery Capacity & Voltage | Solar Current & Voltage | Load Current & Voltage | Duration to discharge each battery completely |
|---|---|---|---|---|---|
| 1 | 10 | 4 Ah<br>4 V | 60 A<br>6 V | 60 A<br>40 V | 9 minutes |

TABLE 7-continued

| Case | Number of Batteries | Battery Capacity & Voltage | Solar Current & Voltage | Load Current & Voltage | Duration to discharge each battery completely |
|---|---|---|---|---|---|
| 2 | 20 | 4 Ah<br>4 V | 60 A<br>6 V | 60 A<br>80 A | 5 minutes |
| 3 | 60 | 4 Ah<br>4 V | 60 A<br>6 V | 60 A<br>240 V | 1.5 minute |
| 4 | 100 | 4 Ah<br>4 V | 60 A<br>6 V | 60 A<br>400 V | 50 sec |
| 5 | 10 | 4 Ah<br>4 V | 100 A<br>12 V | 60 A<br>40 V | 30 minutes |
| 6 | 20 | 4 Ah<br>4 V | 100 A<br>12 V | 60 A<br>80 A | 15 minutes |
| 7 | 60 | 4 Ah<br>4 V | 100 A<br>12 V | 60 A<br>240 V | 5 minutes |
| 8 | 100 | 4 Ah<br>4 V | 100 A<br>12 V | 60 A<br>400 V | 3 minutes |
| 9 | 10 | 4 Ah<br>4 V | 120 A<br>24 V | 60 A<br>40 V | 72 minutes |
| 10 | 20 | 4 Ah<br>4 V | 120 A<br>24 V | 60 A<br>80 A | 36 minutes |
| 11 | 60 | 4 Ah<br>4 V | 120 A<br>24 V | 60 A<br>240 V | 12 minutes |
| 12 | 100 | 4 Ah<br>4 V | 120 A<br>24 V | 60 A<br>400 V | 7 minutes |

In an exemplary isolated load battery charging embodiment, the increase in the number of batteries in series in cases 4, 8 and 12 increases the discharge to the load which therefore drains the battery faster. In cases 1, 5 and 8, fewer batteries are used in series connection to the load and the battery discharge is correspondingly lower.

The amp-hour rating of battery depends on the expected use of the battery. When using battery for heavy loads, a higher amp-hour rating is typically better. Battery manufacturers usually recommend charging a battery with current of roughly one-tenth its amp-hour rating such that 40-amp-hour battery charged with 4 A. In an exemplary embodiment, the battery may be configured according to manufacturer requirement and the control unit may be programmed to implement through software code.

Figure 11A:
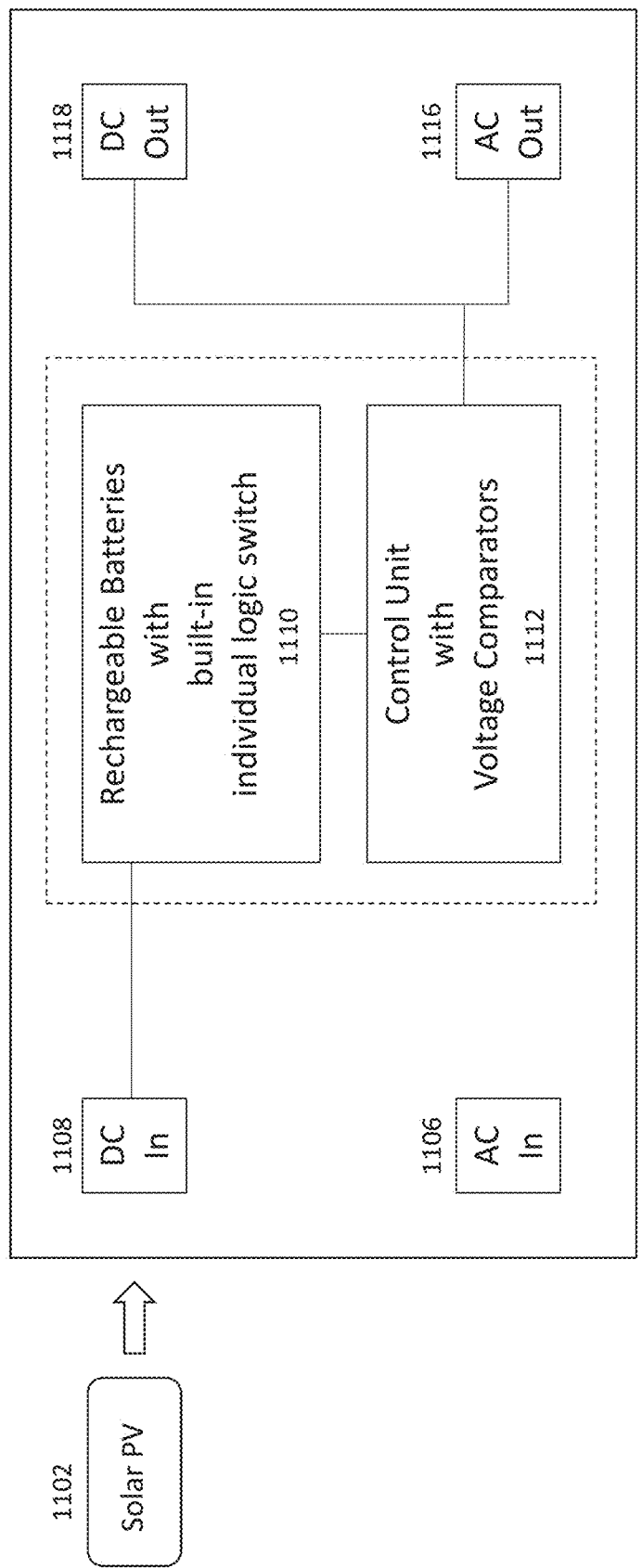
FIG. 11A is an exemplary embodiment of a multi-battery isolated load charging method using renewable power source.
Figure 11B:
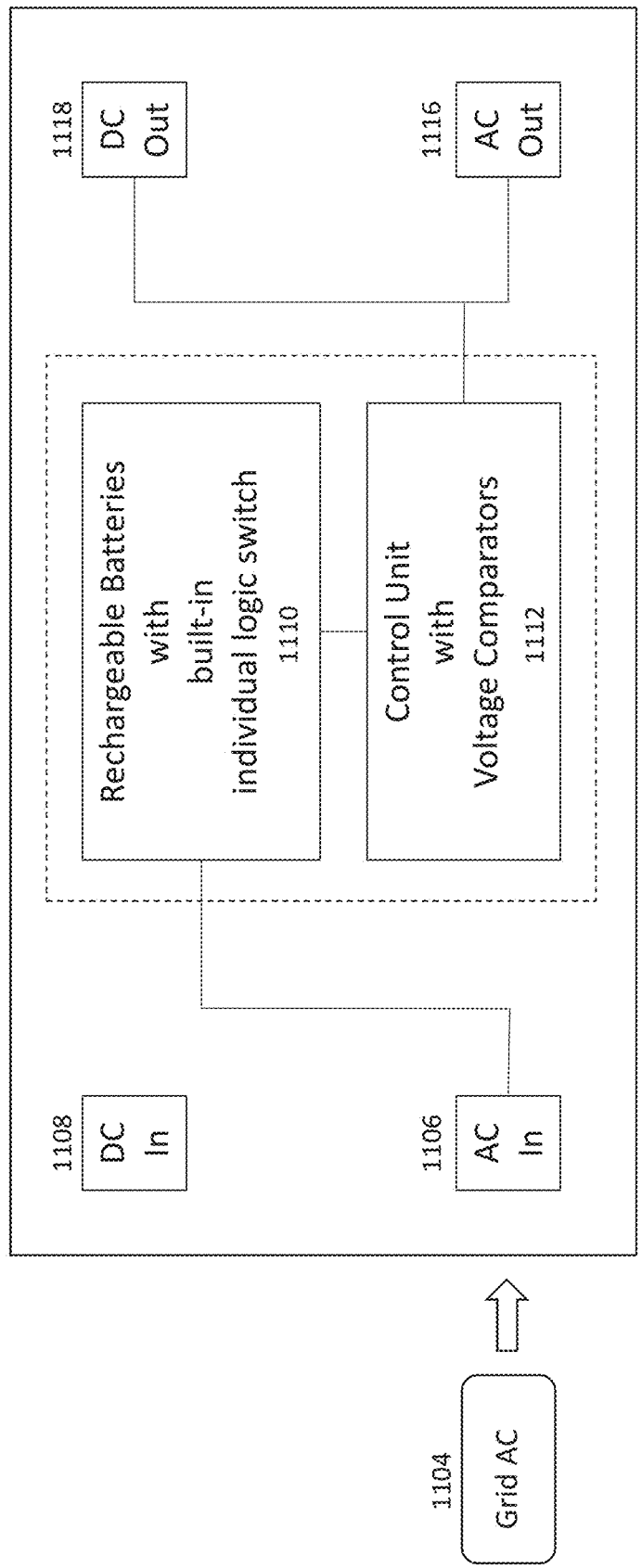
FIG. 11B is an exemplary embodiment of a multi-battery isolated load charging method using AC from the grid.
Figure 12A:
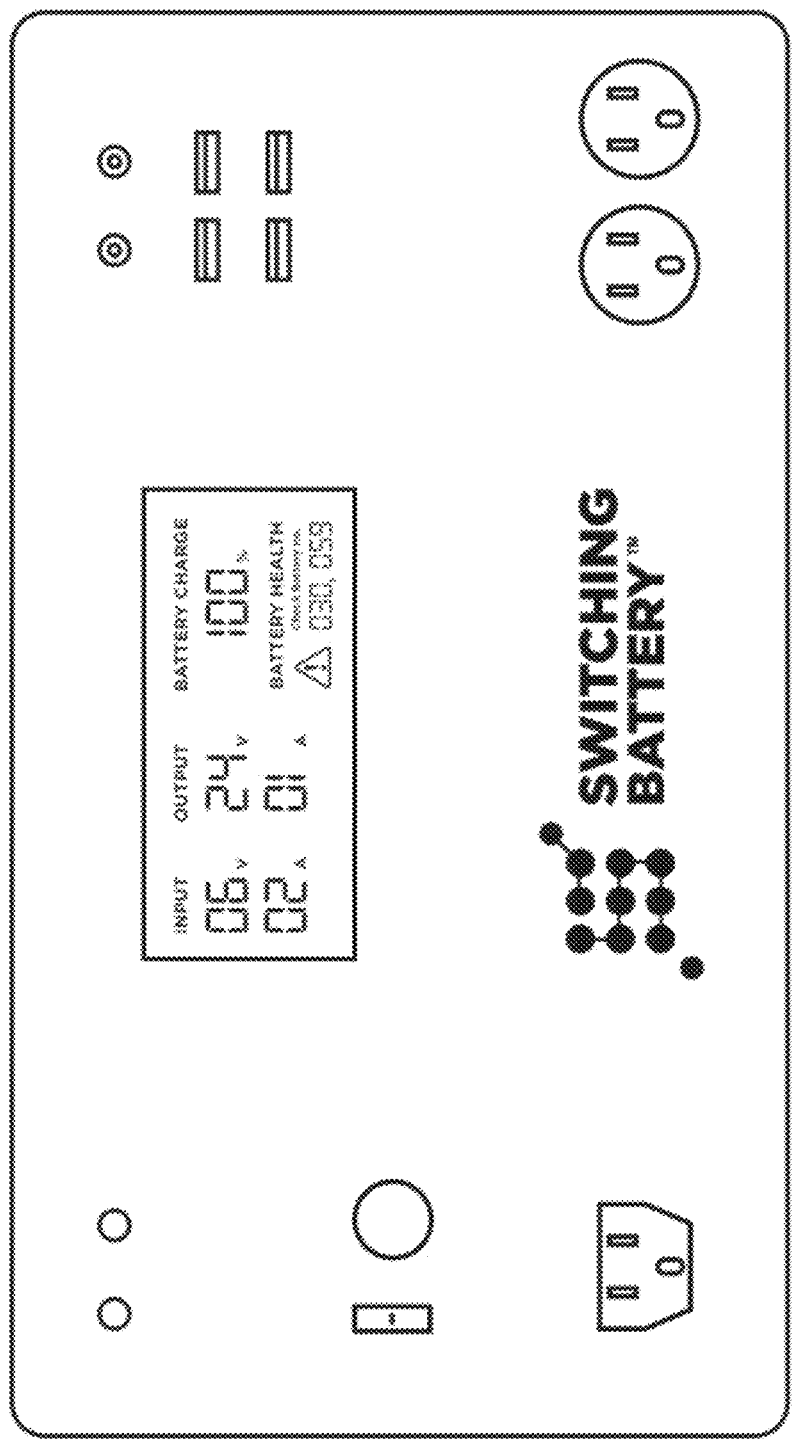
FIG. 12A is an exemplary embodiment of a device for switching multiple batteries.
Figure 12B:
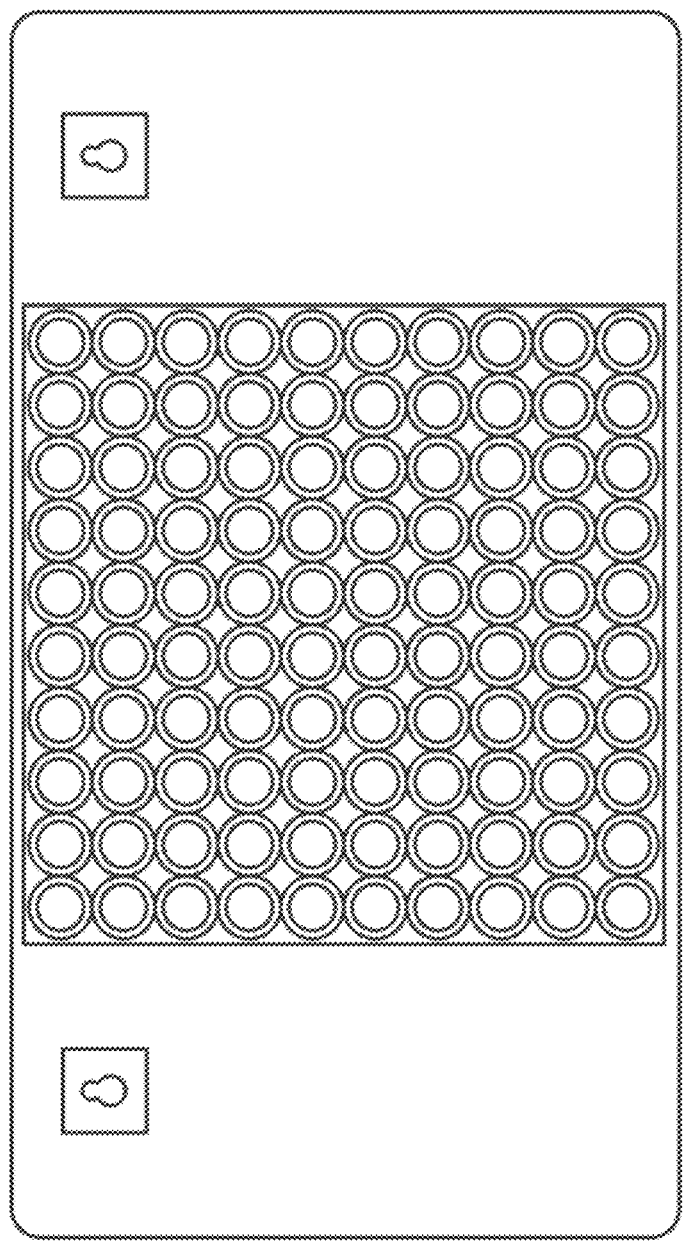
FIG. 12B is an exemplary embodiment of a device for switching multiple batteries.

An exemplary embodiment of a multi-battery isolated load charging method using renewable power source is shown in FIG. 11A. A Solar PV cell 1102 may provide a DC input 1108 to the system which includes the rechargeable batteries with individual logic switches 1110 and the control unit with voltage comparators 1112 which compares voltages of the batteries 1110 and controls the corresponding switches in order to balance the system. Another exemplary embodiment of a multi-battery isolated load charging method using AC from the grid is shown in FIG. 11B, which uses the grid 1104 as a DC input 1106. As shown in the exemplary embodiment in FIGS. 11A and 11B, an exemplary embodiment may include both AC and DC input 1106/1108 as well as AC output 1116 and DC output 1118, depending on the use case.

Solar PV

Solar panel efficiency improvements typically depend on the diversity of the materials used to make them. Different materials require a different amount of photon energy to produce current. Hybrid panels can cover a number of different electron volt values to maximize the energy captured. One problem with this approach is the cost of manufacturing. The standard solar panel is made from silicon, which is widely available and well-understood. As the materials used in solar panels become rarer and more specialized, the cost of manufacturing rises.

Solar cells create electricity when the electrons in the cell's atoms are excited by energy in sunlight. The outermost electrons in the atoms exist at an energy level called the valence band. When they get enough energy from sunlight, the electrons jump to an energy level called the conduction band. When a cell is heated, the difference between the valence band and the conduction band decreases. Therefore, while the electrons may be freed more easily in hot temperature, they do not carry as much energy when they are released.

Cells in solar panels may be connected in either series or parallel connections to obtain a number of combinations of voltage and current, resulting in a wide variety of output power ratings. Similar to batteries avoiding cell balancing issues when connected in parallel, solar panels may avoid shading problems when connected in parallel. If a shaded cell is connected in series with other cells, the solar panel may result in an imbalance. In extreme cases, the power imbalance may damage a solar panel. For this reason, panels are typically equipped with bypass diodes, which redirect the flow of current around shaded or impaired cells.

In an exemplary embodiment, the solar panel may be the Host (Host 1 and Host 2 combined) to hold all cells where the cells in the solar panel may be connected to a control unit through a logic switch such that the solar cells may be connected to another solar cell in series in one cycle and parallel in the next cycle. In a further exemplary embodiment, the control unit may be programmed to switch to parallel when a cell in the solar panel is shaded to make the solar panel more efficient.

Solar panel manufacturers may, for example, use an average available solar energy of 1,000 watts per square meter. The power output of a solar panel depends on the voltage and current generated by its individual cells. A typical silicon solar cell generates between 0.5 and 0.6 volts. The output current varies depending on the size of the cell. Commercially available silicon cell typically produces a current between 28 and 35 milliamps per square centimeter.

Referring to FIG. 3, illustrating a prior art embodiment, a solar panel of 16V 8 A (128 Watts) may be used for a load of 12V 8 A (96 Watts) and where the battery is 12V 8 Ah (96 Watt/hour). The solar panel is therefore designed higher than the load resulting in an extra power of 32 Watts.

In an exemplary embodiment, the solar panel could therefore be sized appropriate at 12V 8 A (96 Watts) which connected by a control unit and switches to 2 batteries of 6V 4 Ah where during the first cycle, the batteries are connected in parallel to the 12V solar panel to charge each 6V battery and during the second cycle, the batteries are connected in series to deliver 12V to the load. In a further solar panel embodiment, the cells are arranged in parallel configuration and connected to a control unit through logic switches such that the solar panel is able to provide ambient voltage and current required using software codes and algorithms.

Solar cells release some energy as heat. Depending on the way in which the panel is mounted and the surrounding air conditions, this heat could affect the operating temperature of the panel. For example, a roof mounted panel will not ventilate heat as well as a freestanding one. This will increase the heat of the panel and therefore decrease the efficiency. Wind, on the other hand, helps carry heat away from the cells. Therefore, a cold, windy day is ideal for generating solar electricity. This will increase the panel's power output and dissipate the panel's own heat.

Battery Box with 100 Batteries

An exemplary embodiment may implement an arrangement of batteries connected to switches. For example, an arrangement of 100 Lithium Ion 18650 batteries may be charged by an energy source which supplies power at 6V and 300 A. The energy from the batteries may be consumed by a load which draws AC power at, for example, 120V, for use in the United States, or 220V for use in India, at 300 A. In an exemplary embodiment, the batteries may be connected in parallel to the energy source during one half of the cycle and in series with the load during the other half of the cycle. The cycle may switch between series and parallel at any desired frequency, such as 60 Hz for use in the United States, or 50 Hz for use in India, for example. To achieve AC output, the batteries may be connected to the load one by one, gradually, in series, in order to achieve an approximate sine wave. When a battery is not connected to the load, it may be connected to the power source in parallel for charging. In an exemplary embodiment, an H bridge configuration may be connected to the load and used to reverse the polarity of the voltage during the negative half-cycle of the operation.

Figure 13:
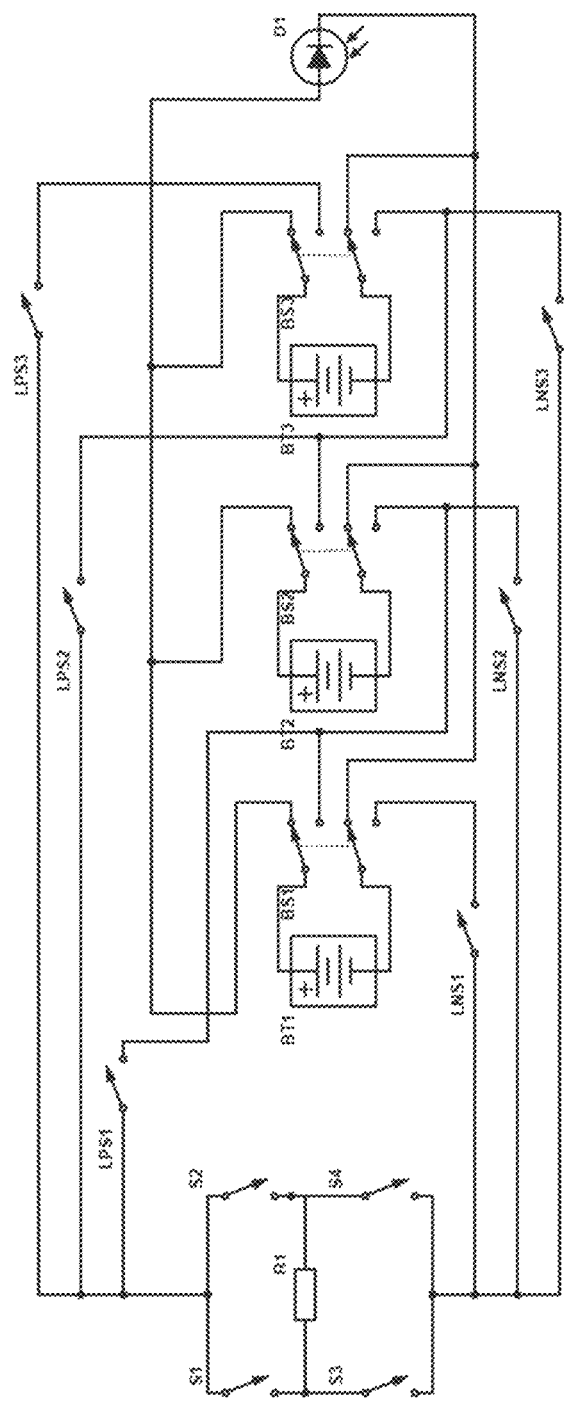
FIG. 13 is an exemplary schematic circuit diagram of an exemplary embodiment.

FIG. 13 illustrates an exemplary circuit diagram containing three load positive switches LPS1/LPS2/LPS3 and three load negative switches LNS1/LNS2/LNS3, as well as three batteries BT1/BT2/BT3 and three battery switches BS1, BS2, and BS3. The exemplary circuit diagram in FIG. 13 may generate a modified sine wave at the load. Each one-fourth part of the pseudo-sine wave cycle may be divided into any number of sub-parts as there are number of batteries. Each sub-part may have a stepped increase in voltage applied to the load. For example, in an exemplary embodiment with three batteries, each one-fourth of the cycle may be divided into three equal parts, and each battery may be subsequently connected to the load. If the cycle time is 1 unit, then each sub part, one-third of one fourth of the cycle, will be $\frac{1}{4} \times \frac{1}{3} = \frac{1}{12}$ units. Each sub part may further include two halves, where each half is $\frac{1}{24}$ units of time, or $\frac{1}{24}$th of the cycle.

Still referring to the exemplary embodiment in FIG. 13, the load may be connected using switches S1 and S4 during the first half of the cycle. During the first $\frac{1}{24}$th of the cycle, no battery is connected to the load. During the next $\frac{1}{24}$th of the cycle, load may be connected to BT1 by connecting LPS1 and LNS1 and toggling BS1. For the next $\frac{1}{24}$th unit of time, BT1 is kept connected to the load. Next, BT2 is connected in series to the load, by toggling BS2, and LNS2 and switching off LNS1. LPS1 is left unchanged. This state is kept for $\frac{1}{12}$th of a unit of time.

Figure 14:
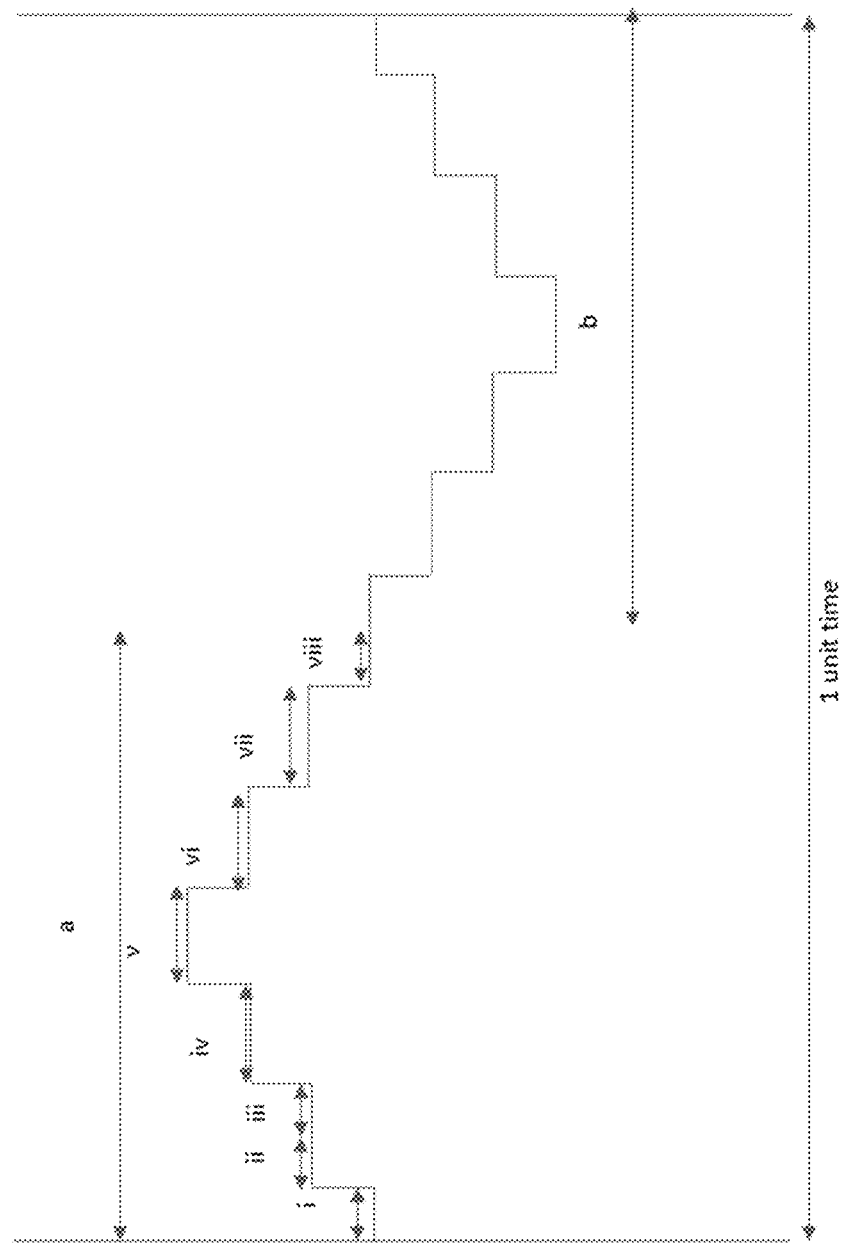
FIG. 14 is an exemplary plot of an exemplary embodiment.

Next, BT3 is connected in series to the load, by toggling BS3, and LNS3 and switching off LNS2. LPS1 is left unchanged. This state is kept for $\frac{1}{12}$th of a unit of time. At this point, all three batteries are connected to load and the peak voltage is reached. Now, BT1 is disconnected from load by toggling BS1 and LPS1. Now, LPS2 is switched on. LNS3 is left unchanged. This state is kept for $\frac{1}{12}$th of a unit of time. Now, BT2 is disconnected from the load by toggling BS2 and LPS2. Now, LPS3 is switched on. LNS3 is left unchanged. This state is kept for $\frac{1}{12}$th of a unit of time. Now, BT3 is disconnected from the load by toggling BS3 and LPS3. LNS3 is also toggled off. This state is kept for $\frac{1}{24}$th of a unit of time. To reverse the load polarity now, the load may be connected to switches S2 and S3. The above cycles may be repeated to generate the negative mirrored step wave, such as the one illustrated in FIG. 14.

A charge balance equation may be used to find the charge present in the batteries of the circuit during the two phases. In an exemplary embodiment for illustrative purposes, multiple identical batteries which output constant voltage across their terminals may be implemented. It may be assumed that the batteries and solar panel have no inefficiency and that the voltage and current supplied by the sources and consumed by the load is constant, and that the resistance of all connecting wires is negligible. In this exemplary embodiment, the circuit may be governed by the following equation:

$$q_i(t) = q_i(t-1) + \int_{t-1}^{t} i_R dt/n \; (i \in (1, 2, 3 \ldots n))$$

where,
$q_i(t)$=Charge in battery i at time t (i∈(1, 2, 3 ... n)
$i_R$=Current supplied by the renewable energy source
$i_L$=Current consumed by the load
n=Number of batteries connected to the renewable energy source/load at any given time When the battery is charging, power given by the renewable energy source may be stored in the form of charge as per the above equation. The charge supplied may be equally divided among all n batteries.

When the battery is connected in series to the load, each battery may discharge an equal amount of charge to power the load and may pass the required current based on the following equation:

$$q_i(t) = q_i(t-1) + \int_{t-1}^{t} i_L dt/n$$

Figure 15A:
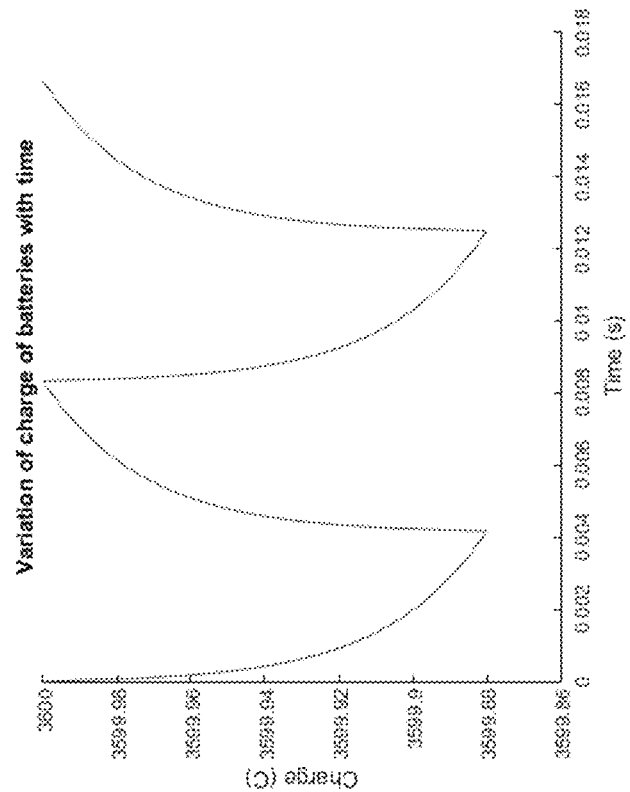
FIG. 15A is an exemplary plot illustrating charge versus time of an exemplary embodiment.

Implementing the foregoing equations, a simulation executed in MATLAB may illustrate some effects of an exemplary embodiment. For example, in a simulation with 46 batteries, a frequency of 60 Hz, and a full initial charge of the batteries, the batteries were exhausted after 1104 seconds without a source connected, and the RMS load voltage was 120.349574V. FIG. 15A illustrates a graphed output plotting the variation of charge of the batteries versus time of this exemplary simulation.

Figure 15B:
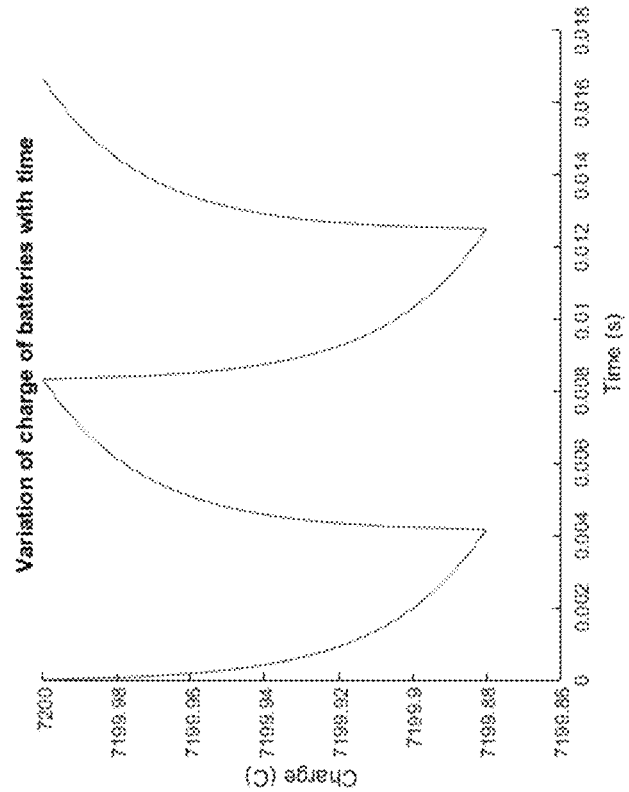
FIG. 15B is an exemplary plot illustrating charge versus time of an exemplary embodiment.

In another exemplary simulation, 46 batteries may be simulated with switching at 60 Hz, representing an American use case, and an initial battery charge of 50%. The batteries in this exemplary simulation were exhausted after 552 seconds and had an RMS load voltage of 219.349574. FIG. 15B illustrates a graphed output plotting the variation of charge of the batteries versus time of this exemplary simulation.

Figure 15D:
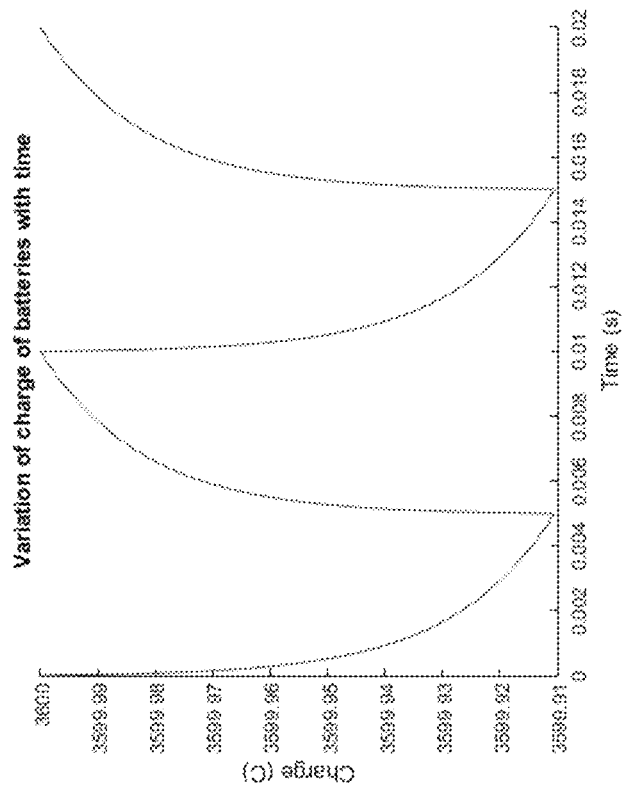
FIG. 15D is an exemplary plot illustrating charge versus time of an exemplary embodiment.
Figure 15C:
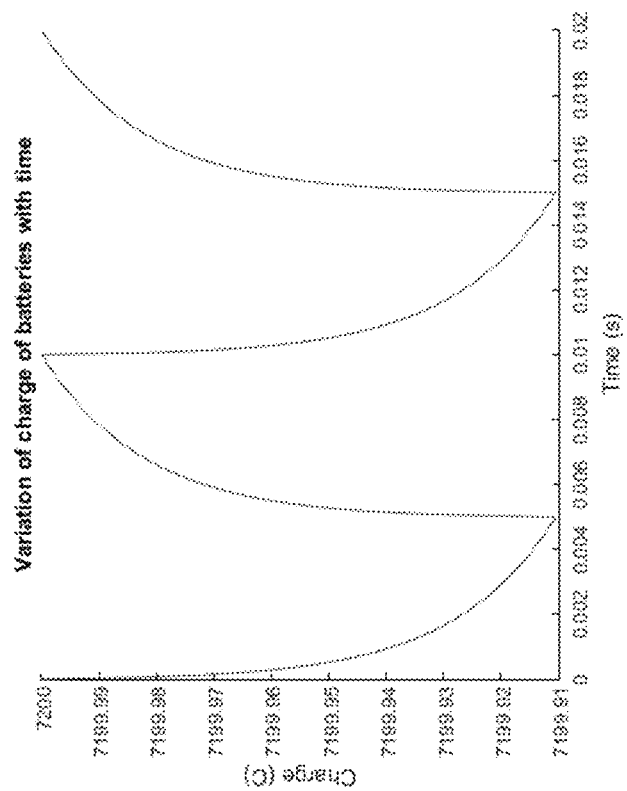
FIG. 15C is an exemplary plot illustrating charge versus time of an exemplary embodiment.

In a third exemplary simulation, 84 batteries were simulated with switching at 50 Hz, representing an Indian use case, with the batteries initially fully charged. The batteries in this exemplary simulation were exhausted after 2016 seconds and had an RMS load voltage of 219.768788. FIG. 15C illustrates a graphed output plotting the variation of charge of the batteries versus time of this exemplary simulation.

In a fourth exemplary simulation, 84 batteries were simulated with switching at 50 Hz, representing an Indian use case, with the batteries initially charged to 50% capacity. The batteries in this exemplary simulation were exhausted after 1008 seconds and had an RMS load voltage of 120.768788. FIG. 15D illustrates a graphed output plotting the variation of charge of the batteries versus time of this exemplary simulation.

As illustrated by the examples in FIGS. 15A-D, the charge of the batteries may vary continuously across the cycle, and may decrease when a battery is connected to the load and increases when the battery is connected to the source. The rate of change of charge may also vary continuously depending on the number of batteries connected to the load and the source.

Figure 16:
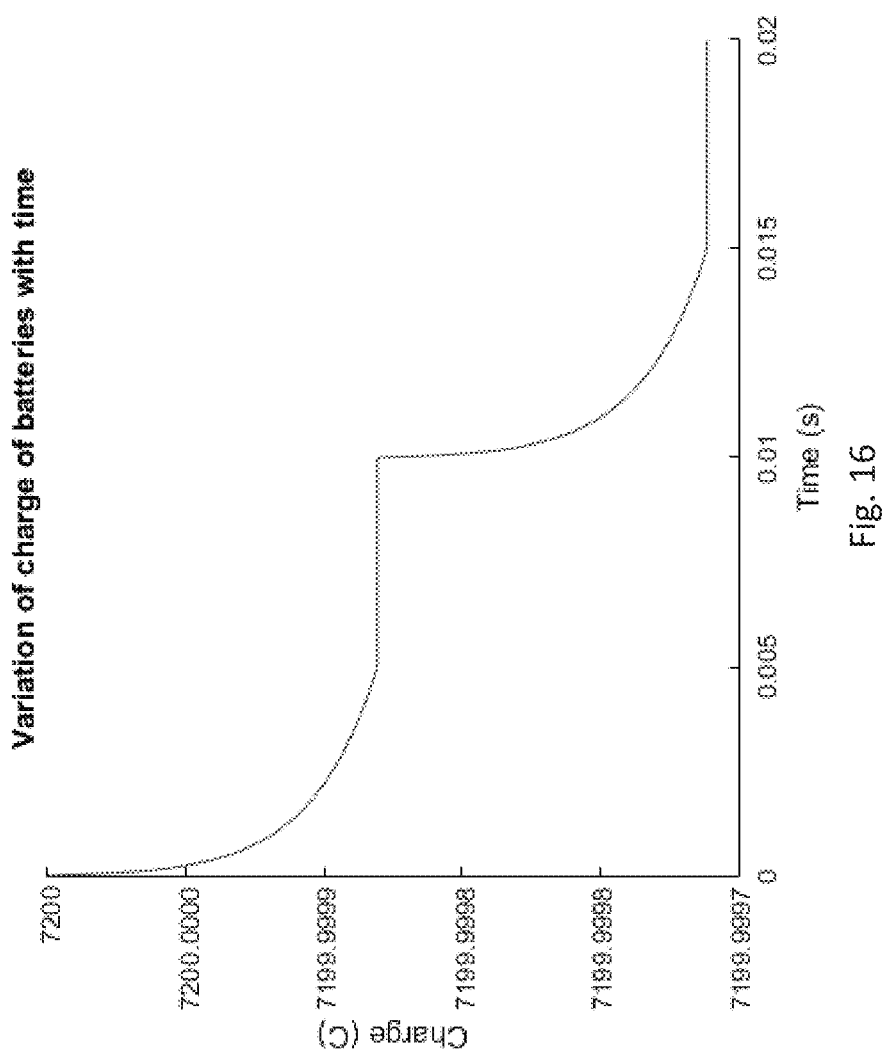
FIG. 16 is an exemplary plot illustrating charge versus time of an exemplary embodiment.

In another exemplary embodiment, a load may be powered to the battery pack in an exemplary real-world test scenario. In this exemplary embodiment, the load may be a 70 W ceiling fan and 18 W LED light bulb. Based on these values, the battery pack may supply the load with an output at 220V 1512000 seconds before battery exhaustion. FIG. 16 illustrates a graphed output plotting the variation of charge of the batteries versus time of this simulation.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A photovoltaic power-conditioning system comprising:
(a) a plurality of photovoltaic sub-modules including a first photovoltaic sub-module and a second photovoltaic sub-module, each having a positive node and a negative node;
(b) a plurality of logic switches, each capable of conducting current in both directions, arranged to selectively
   (i) connect the photovoltaic sub-modules in parallel between a first output terminal and a second output terminal, and
   (ii) connect the photovoltaic sub-modules in series between the first output terminal and the second output terminal;
(c) a control circuit that, in response to partial shading of any photovoltaic sub-module, selects between a parallel configuration and a series configuration so as to maintain power delivery based on duty cycle to a load coupled to the output terminals; and
(d) wherein the photovoltaic power-conditioning system does not contain electro-chemical battery cells between the photovoltaic sub-modules and the output terminals and does not use inductors for voltage adjustment between the photovoltaic sub-modules and the output terminals.

2. The photovoltaic power-conditioning system of claim 1, further comprising at least one capacitive energy-storage element connected across the first output terminal and the second output terminal, the control unit charging the capacitive energy-storage element during the parallel configuration and discharging the capacitive energy-storage element to the load during the series configuration.

* * * * *